Aug. 3, 1954  E. W. HAAS ET AL  2,685,406
FARE BOX
Filed Sept. 19, 1950  15 Sheets-Sheet 2
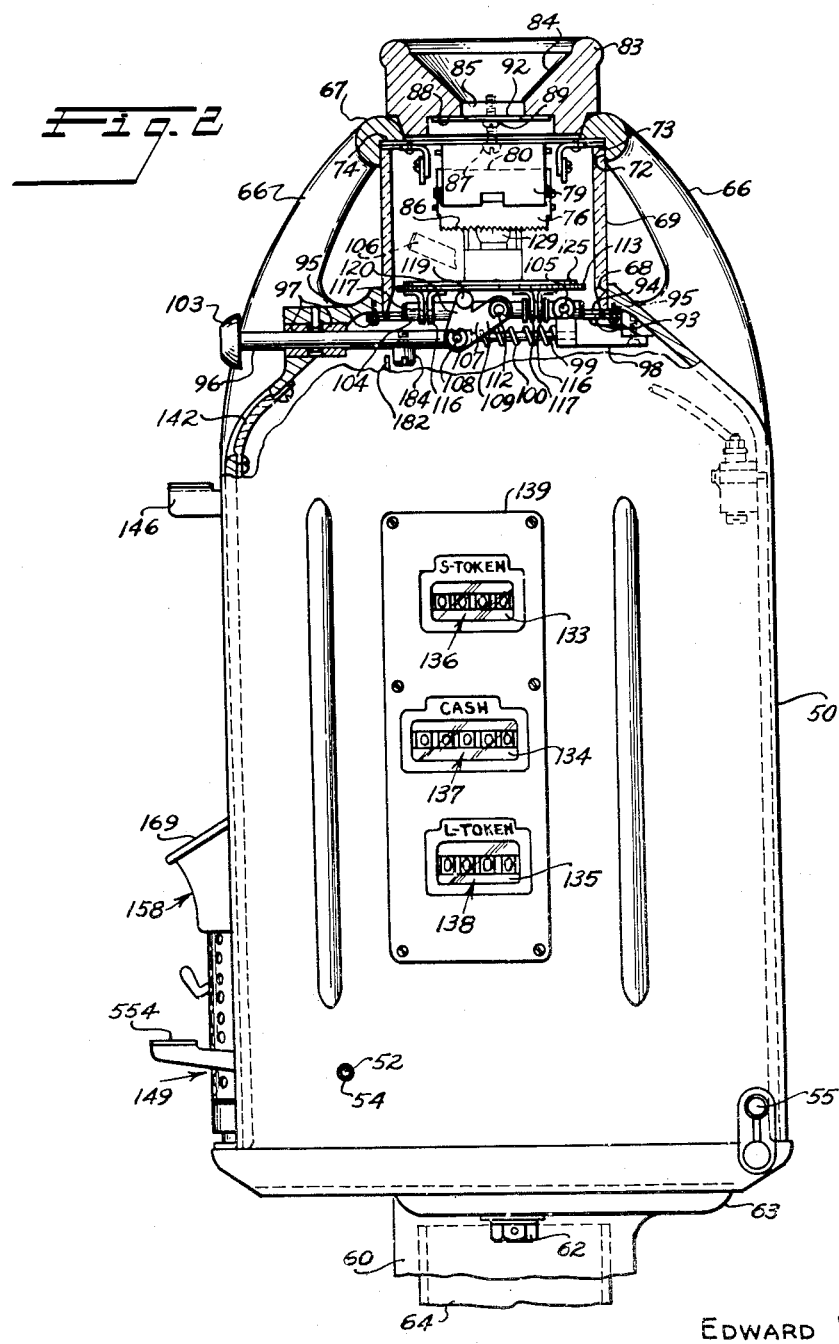
INVENTORS
EDWARD W. HAAS
DONALD L. BROWN
BY *Strauch, Nolan & Diggins*
ATTORNEYS

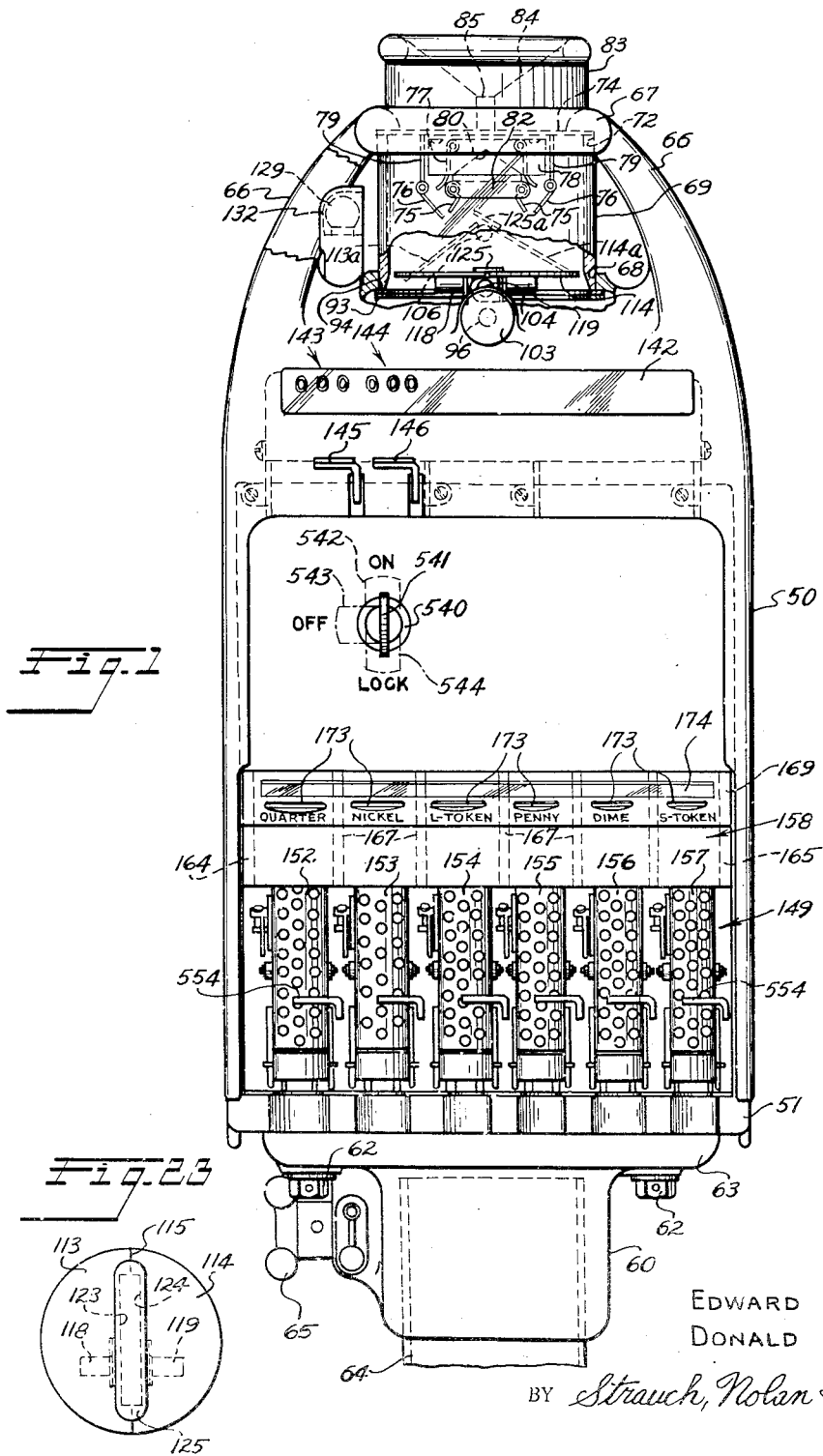

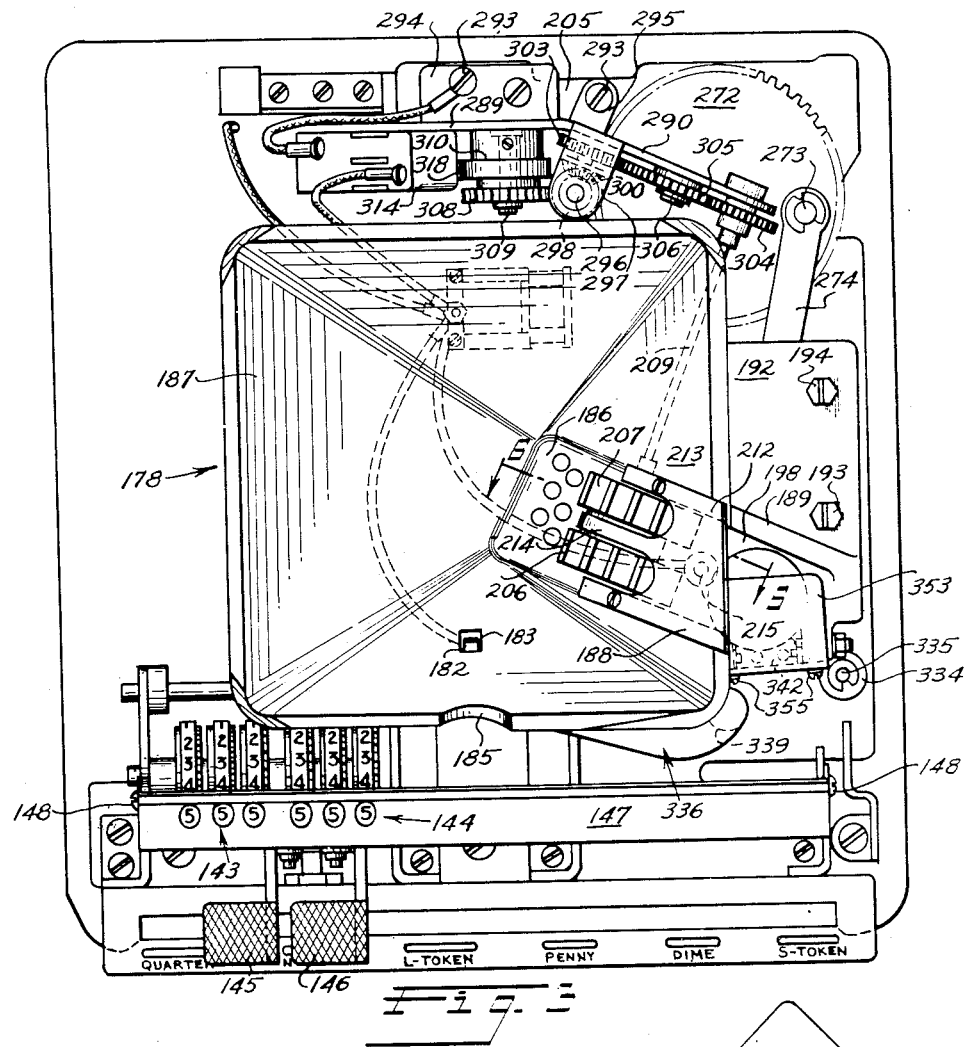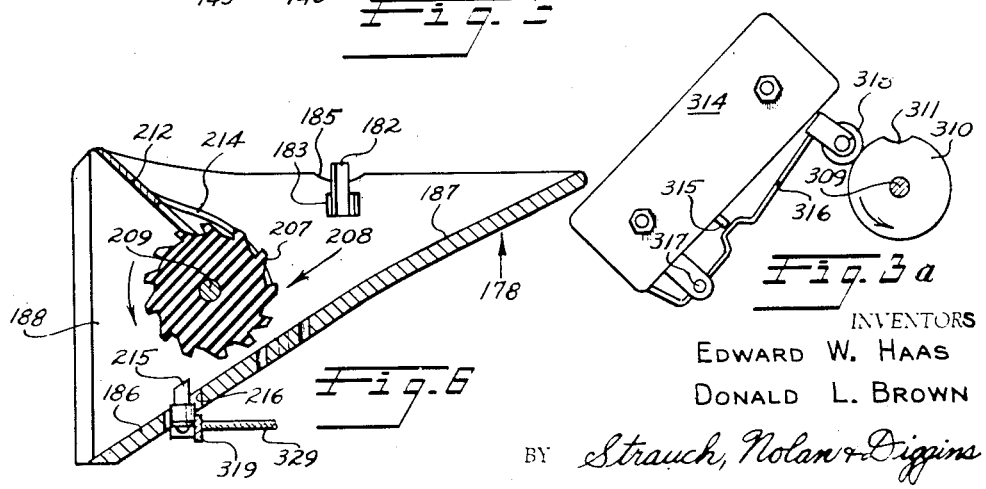

Aug. 3, 1954 E. W. HAAS ET AL 2,685,406
FARE BOX
Filed Sept. 19, 1950 15 Sheets-Sheet 4

INVENTORS
EDWARD W. HAAS
DONALD L. BROWN
BY Strauch, Nolan & Diggins
ATTORNEYS

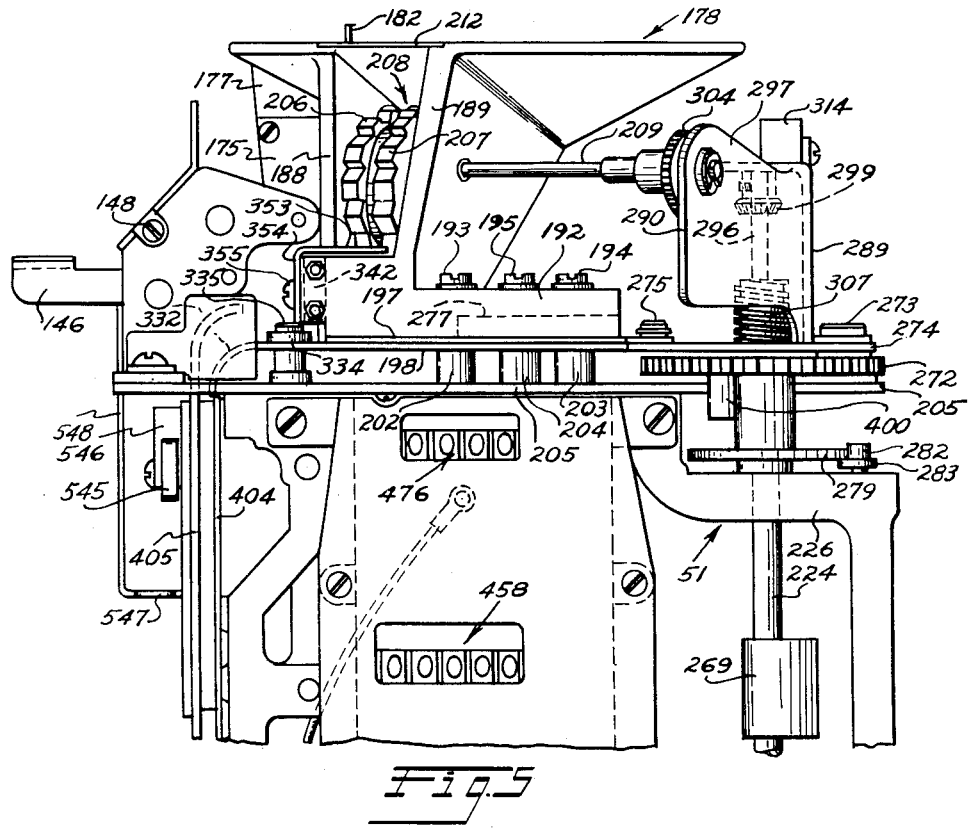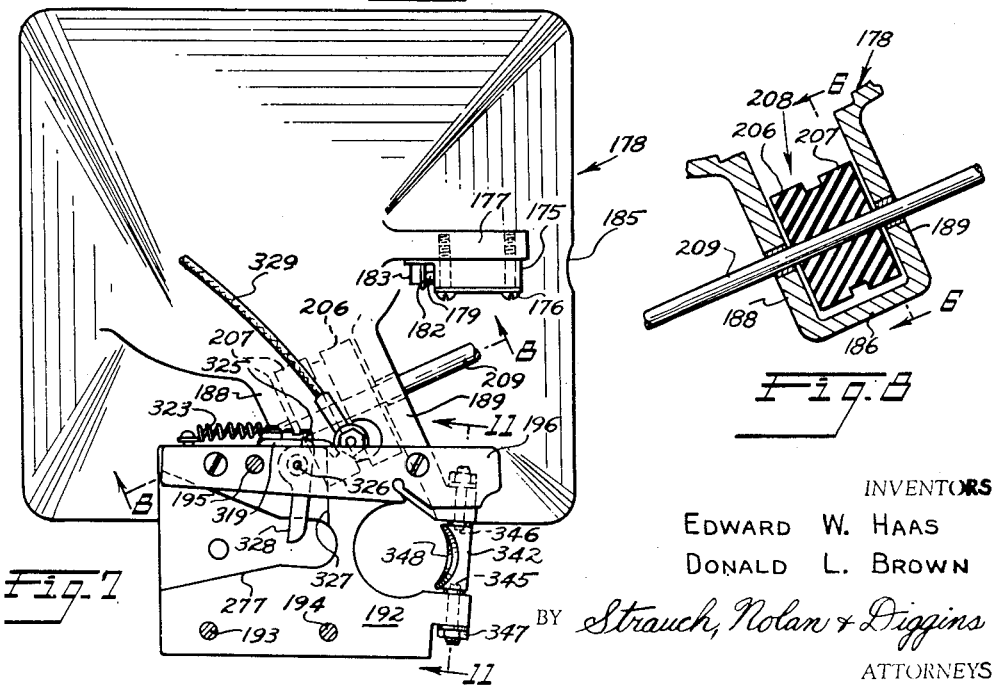

INVENTORS
EDWARD W. HAAS
DONALD L. BROWN
BY Strauch, Nolan & Diggins
ATTORNEYS

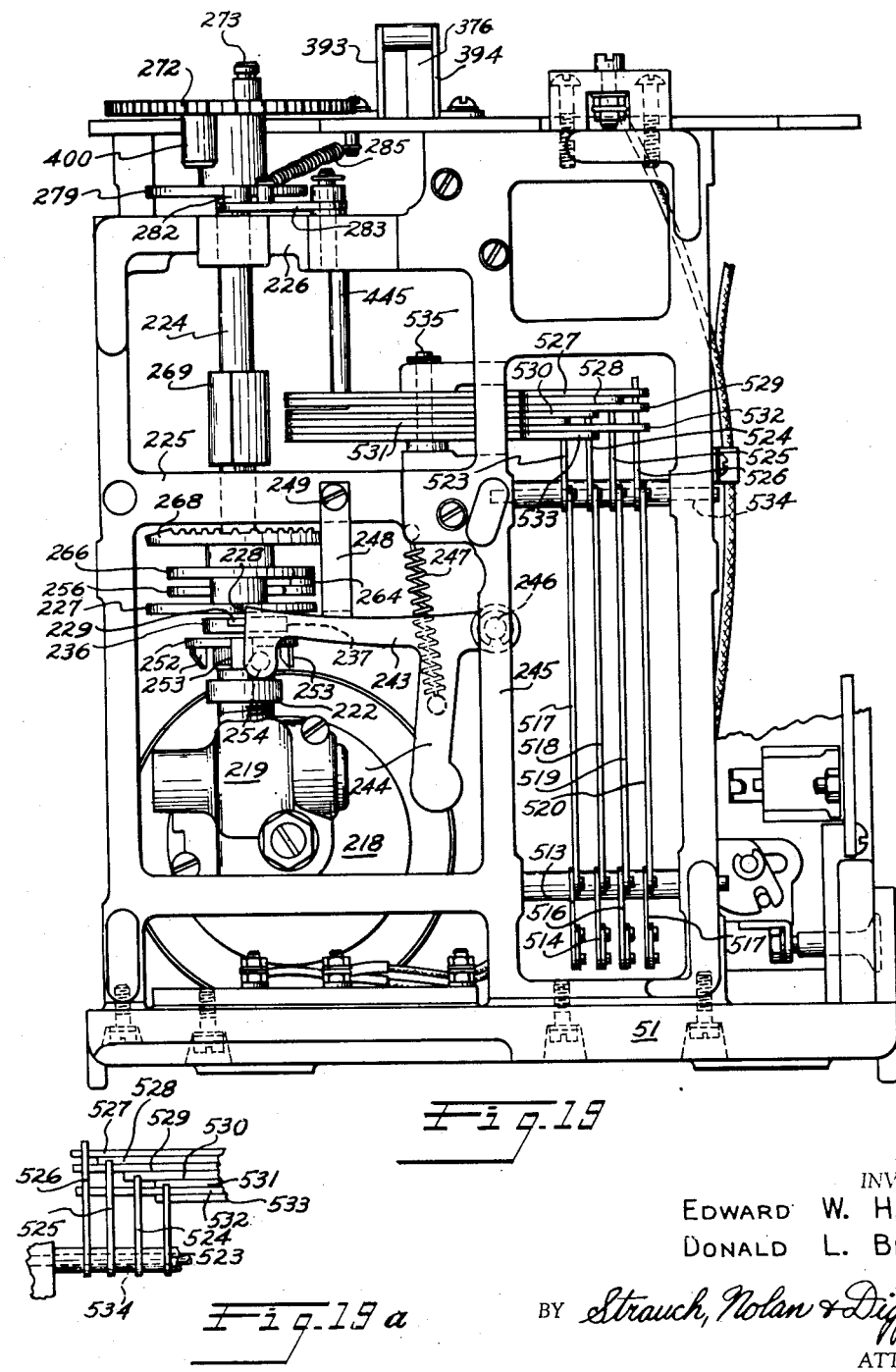

Aug. 3, 1954 E. W. HAAS ET AL 2,685,406
FARE BOX
Filed Sept. 19, 1950 15 Sheets-Sheet 11
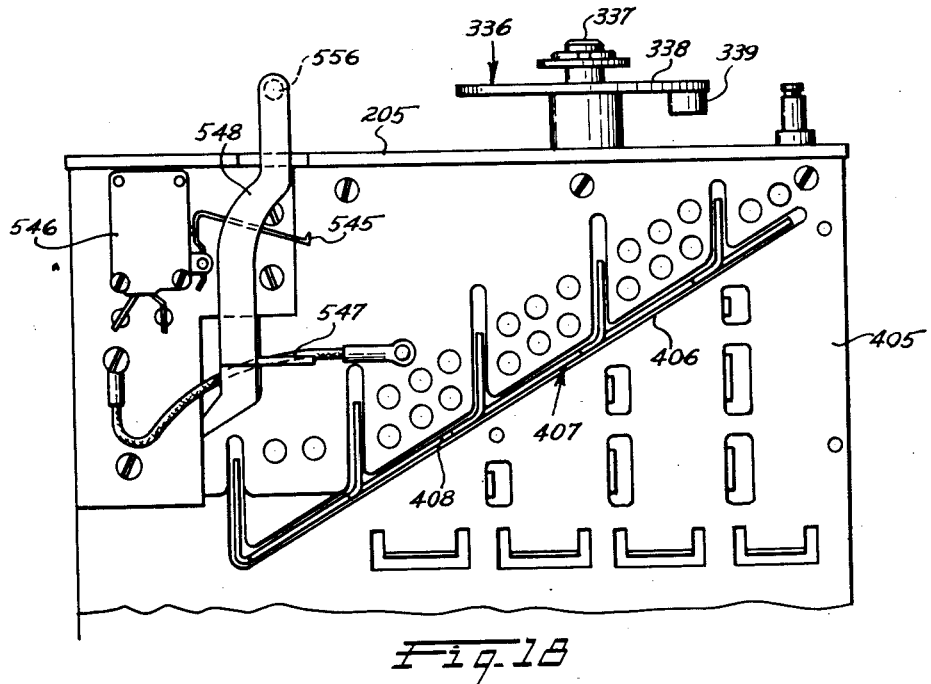
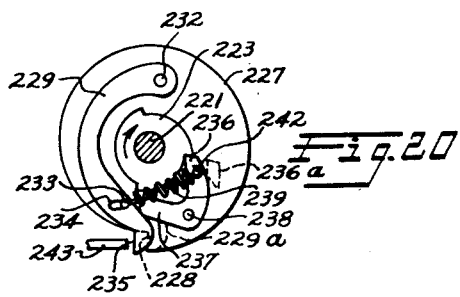
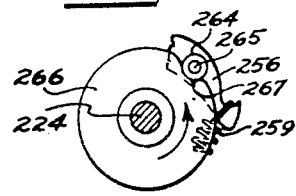
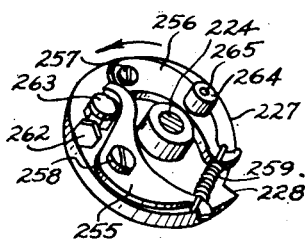
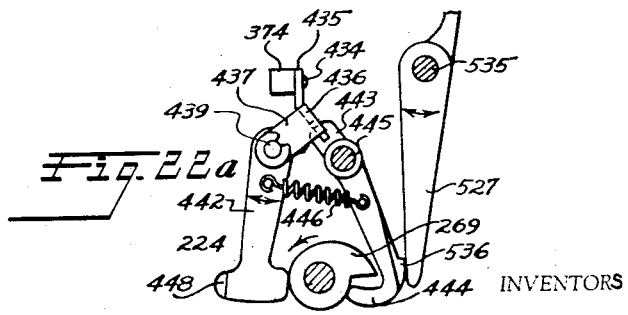
INVENTORS
EDWARD W. HAAS
DONALD L. BROWN
BY Strauch, Nolan & Diggins
ATTORNEYS

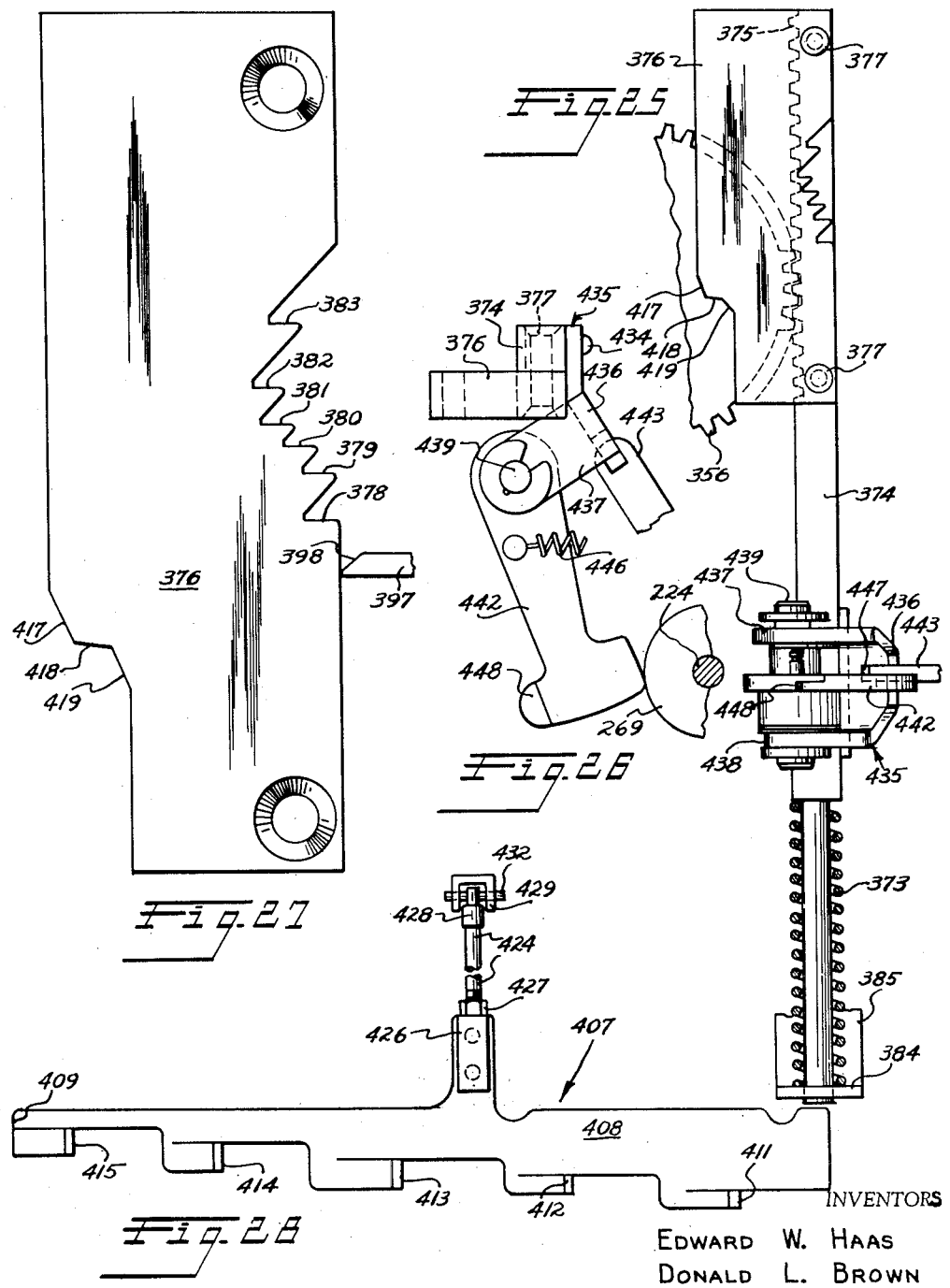

Aug. 3, 1954          E. W. HAAS ET AL          2,685,406
                          FARE BOX
Filed Sept. 19, 1950                      15 Sheets-Sheet 13
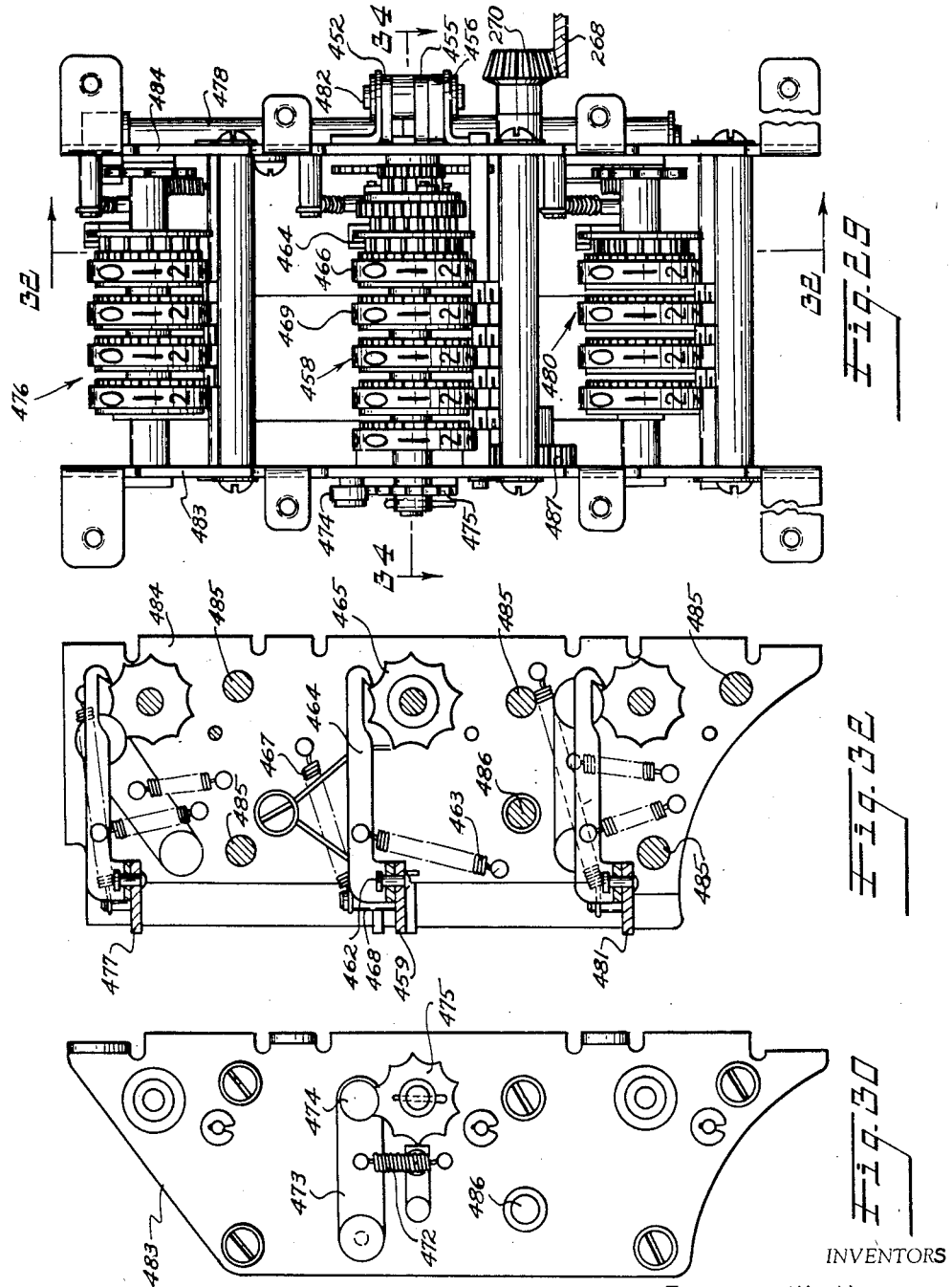
INVENTORS
EDWARD W. HAAS
DONALD L. BROWN
BY *Strauch, Nolan & Diggins*
ATTORNEYS

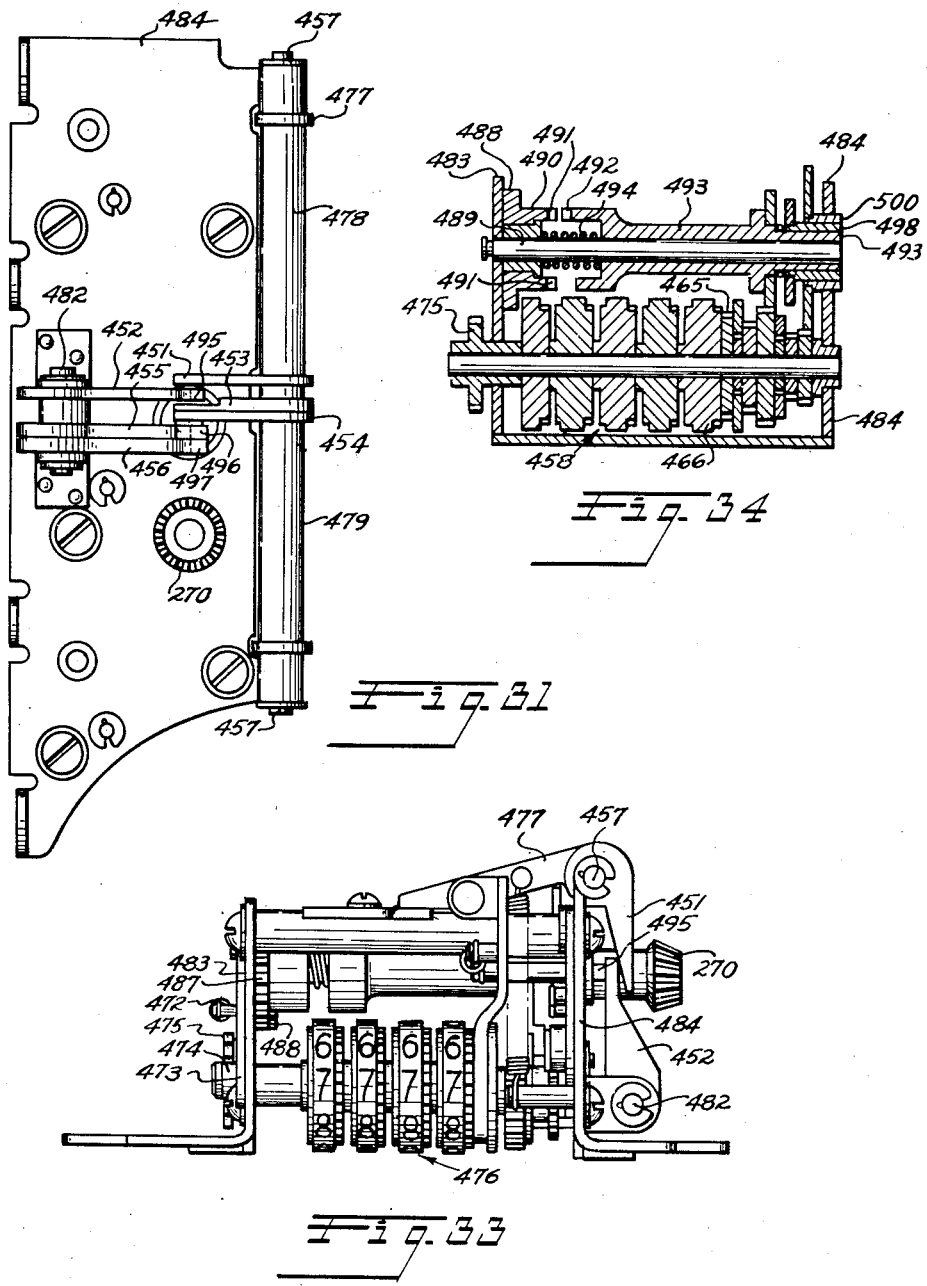

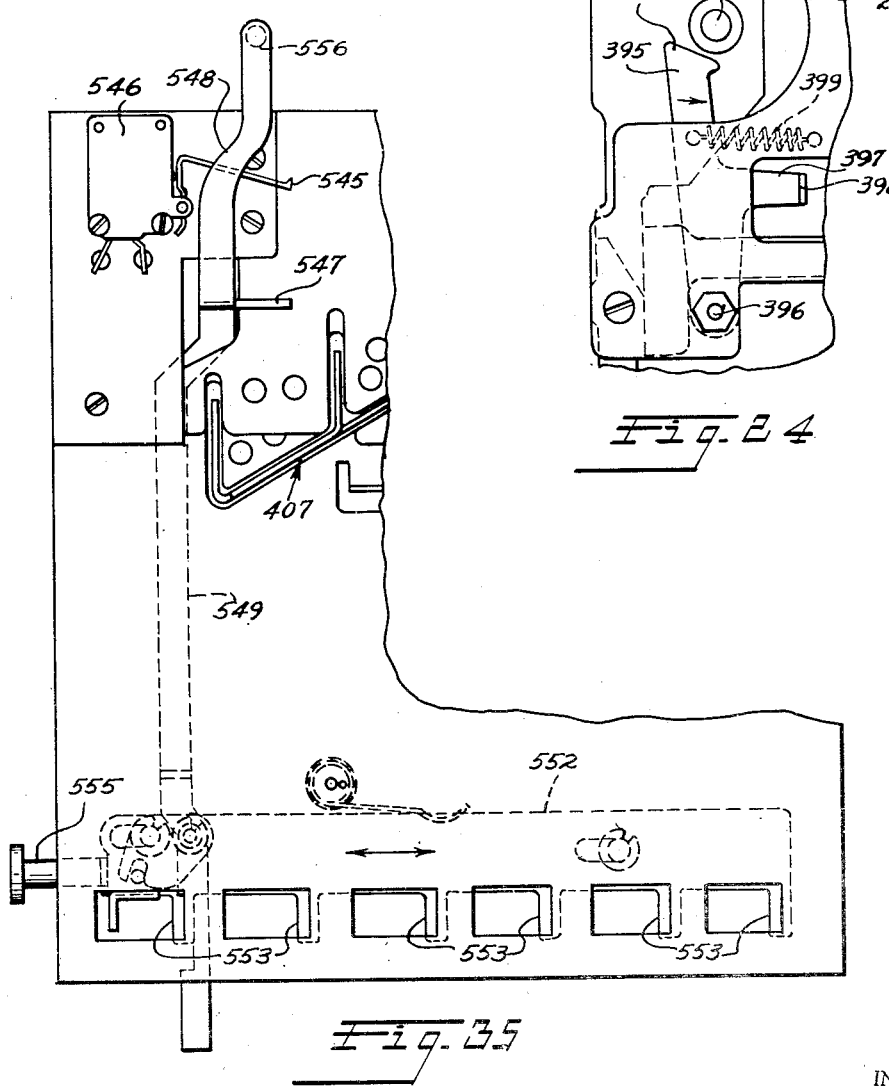

Patented Aug. 3, 1954

2,685,406

UNITED STATES PATENT OFFICE 2,685,406

FARE BOX

Edward W. Haas and Donald L. Brown, Dayton, Ohio, assignors to Rockwell Register Company, a corporation of New York Application September 19, 1950, Serial No. 185,532

9 Claims. (Cl. 235—32)

This invention relates to coin sorting and registering devices of the type used on street cars, buses and the like, ordinarily called fare boxes.

Such fare boxes are provided to speed fare collections, to record fares collected and to check dishonesty, and are of several types, ranging from a simple lock box wherein deposited coins fall into a locked box out of reach of the operator, to the substantially fully automatic type such as shown in the Patent No. 2,238,575 issued to F. F. Daugherty on January 4, 1944 in which after registration, the fares are made available to the operator by sorting and distribution in a convenient change maker.

The present invention comprises improvements in fare boxes of the type shown in said Daugherty patent. While the box of said patent is a substantial improvement over the earlier boxes, it has been found to be subject to certain disadvantages in operation, particularly in its vulnerability to deliberate jamming by use of bent tokens, coins and slugs, and by imposing excessive coin loads on the mechanism in order to disable the box to permit the operator to make direct fare collections without registration. The mechanism of Daugherty box is also such as to receive slugs, buttons and the like more readily than is desirable under practical operating conditions without rejection, and its cost in construction and maintenance and service requirements limits its market from a competitive view point.

It is accordingly a primary object of our invention to provide a new and improved simplified lower cost motor driven and manually controlled fare box which is less subject to jamming than the prior boxes.

Another object is the provision of novel slug rejection mechanism that prevents the discharge from the hopper of bent coins, buttons, or other objects that would jam the gaging or sorting mechanism.

A further object is the provision of a novel fare box embodying an improved coin inspection zone and a coin dumping mechanism that when actuated also initiates operation of the motor that drives the fare box.

Another object is to provide a simplified motor circuit, which assures that all of the acceptable coins or tokens discharged by the dumping mechanism into the hopper are sorted and registered before the motor stops to prevent jamming by dumping heavy coin loads into the hopper.

A still further object is the provision in the coin chute from the hopper, of a metering control for the flow of coins from the hopper which maintains the motor circuit closed as long as there is a coin or token in the hopper.

Still another object is the provision in the mechanism driven by the motor, of an overload clutch that prevents damage to the mechanism by permitting operation of the motor if the mechanism should be jammed.

Another object is the incorporation into the gaging, sorting and registering mechanism of adjustable elements that take care at low cost of variations due to manufacturing tolerances and the like, thereby reducing costs of production.

Another object is the provision of a simplified spring pressed one piece coin gate that assures the singling of coins discharged from the coin chute.

In attaining the foregoing, among other improvements, our invention is provided with mechanism controlled by the operator to initiate a series of registering cycles after he has visually inspected the coins that have been held in an inspection receptacle. By means of a plunger actuated by the operator the coins are dumped into a hopper from which they pass into a singling and sorting device. The mechanism within the fare box is driven by an electric motor started in response to movement of the plunger, and other switches maintain the circuit to the motor closed until all of the coins dropped into the hopper have been singled and sorted, after which the motor will stop until its circuit is again closed by actuation of the plunger.

Novel mechanism is also provided in the chute between the hopper and the coin gaging mechanism to prevent the entrance into the coin gaging mechanism of buttons, slugs or coins or tokens that are bent to such a degree as to jam the coin gaging or sorting mechanism. This mechanism in its preferred embodiment comprises a roller which rotates to frictionally engage such objects and throw them back up into the hopper. A contact pin alternately projected up into the coin chute and depressed by the operation of the fare box, is insulated from the chute, and when a coin engages it, a parallel circuit to the motor is closed, to assure further operation of the motor. The contact pin is actuated in timed response to movement of the coin singling ram, and when it projects into the coin chute it blocks the passage of coins to the singling mechanism. It thus also serves as a metering mechanism to permit the passage of single coins to the coin singling and gaging mechanism.

An improved clutch mechanism is also preferably provided between the motor and the main drive shaft which prevents damage to the mechanism if a jam occurs, permitting the motor to rotate while the rest of the mechanism remains stationary. In the preferred embodiment, the gaging mechanism is connected to the sorting and registering mechanism through a gear and rack system, and means are incorporated between the gage mechanism and the gear and rack to adjust the mechanism to take care of manufacturing tolerances etc.

The simplified spring pressed one piece coin gate cooperates with the coin ram and the gaging mechanism to assure the passage of but one coin at a time through the gaging mechanism, and also that the coin lies flat at the time it is being gaged.

A motor instead of a solenoid is used with a simplified wiring system and elimination of relays and condensers required with a solenoid which lowers the cost and service requirement and increases the reliability and freedom from jamming of the box in operation.

Other objects will become apparent as the description proceeds in connection with the accompanying drawings, wherein:

Figure 1 is a front elevation of the preferred fare box of our invention looking directly at the change maker, and with a portion of the cabinet broken away.

Figure 2 is a side elevation as viewed from the right of Figure 1, and partly broken away to expose internal elements.

Figure 3 is a partial top plan view with the cabinet removed, and showing the coin hopper.

Figure 3a is a view showing a holding switch and actuating cam.

Figure 5 is a side elevation of Figure 3, as viewed from the right of Figure 4.

Figure 6 is a sectional view along line 6—6 of Figure 3 or 6—6 of Figure 8, showing the chute through which the coins pass from the hopper to the singling device.

Figure 7 is a bottom plan view of the coin hopper.

Figure 8 is a partial sectional view along line 8—8 of Figure 7.

Figure 18 is a side elevation of Figure 17 as viewed from the right of Figure 17.

Figure 19 is a side elevation of Figure 17 as viewed from the left of Figure 17.

Figure 19a is a view of a portion of Figure 19, as seen from a position 180 degrees removed from the viewpoint of Figure 19.

Figure 20 is a bottom plan view of the clutch assembly of Figure 19, showing a disengageable ratchet drive.

Figure 21 is a perspective view looking toward the top side of the driving elements of a preferred overload clutch.

Figure 22 is a top plan view of the driven element that cooperates with the driving assembly of Figure 21.

Figure 22a is a top plan view of a cam, showing its profile.

Figure 23 is a top plan view of the hinged plates which retain the coins or tokens within the glass window 69 for inspection, and which are hinged for dumping them.

Figure 24 is a view of a portion of Figure 16, but with some parts omitted.

Figure 25 is a side elevation of the gage rack and sorter cam assembly.

Figure 26 is a top plan view of Figure 25.

Figure 27 is a side elevation, substantially enlarged, of the sorter cam.

Figure 28 is a top plan view of the sorter leaf.

Figure 29 is a front view of the counter assembly.

Figures 30 and 31 are side elevations of Figure 29 as viewed from the left and right respectively.

Figure 32 is a section along line 32—32 of Figure 29.

Figure 33 is a top plan view of Figure 31.

Figure 34 is a section along line 34—34 of Figure 29.

Figure 35 is a partial view showing the mechanism operated by the locking key.

Figure 4:
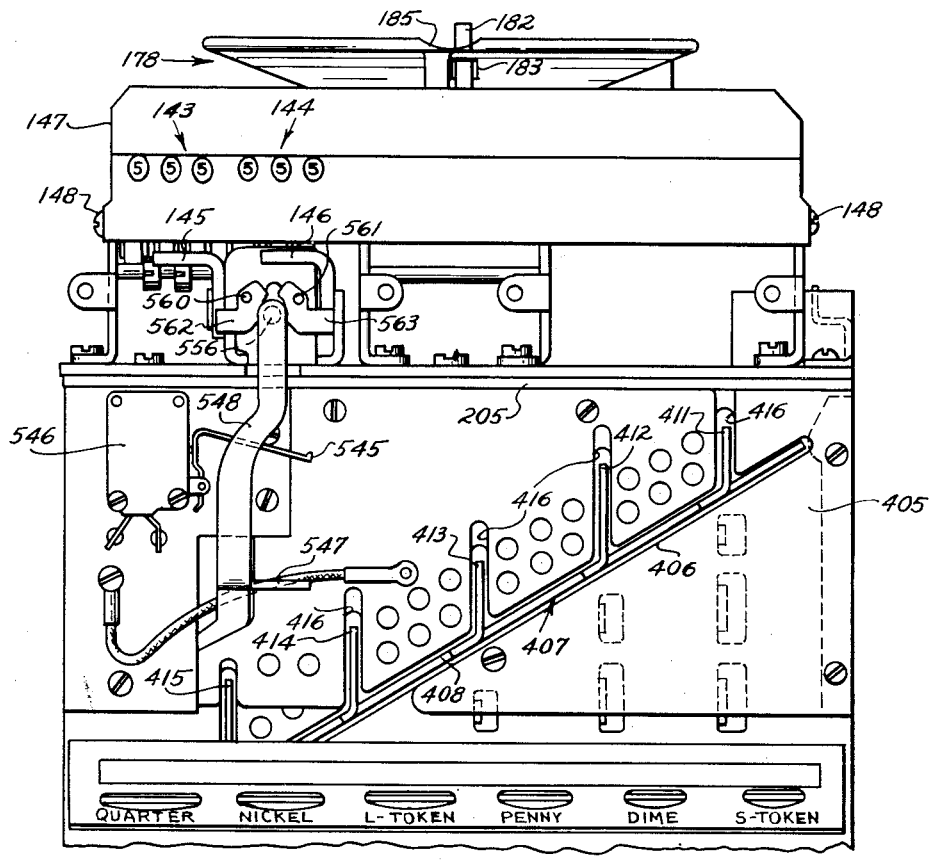
Figure 4 is a front elevation of Figure 3.

Referring to Figures 1 and 2 the preferred fare box includes an exterior cabinet 50 which encloses the internal mechanism. The cabinet is secured to the internal frame 51 (Figure 15) by a pair of outwardly spring pressed pins 52 and 53 that pass through aligned openings 54 in opposite sides of the cabinet near the forward bottom portion thereof. At the lower rear side (Figure 2) a rod 55 passes completely through the opposed side walls of the cabinet and through a series of aligned holes 56 (Figure 14) in the frame. On the other side of the cabinet (Figure 14) is a key actuated latch arm 57 that is rotatable by the key to a locking position where a notch in the lower left end of the arm 57 engages a reduced section 58 in the rod 55 thereby preventing removal of the rod 55 unles a key is inserted in the lock 59 to turn the arm 57 clockwise. Locking of the cabinet is accordingly accomplished by turning the key counter-clockwise.

Referring to Figures 1 and 2 the bottom of the frame 51 is secured by bolts 62 to a base 63 having a cylindrical boss 60 which receives a post or pedestal 64 that supports the fare box at the proper height above the floor. A hand-screw is indicated at 65 for actuating a clamping mechanism (not shown) to secure the base 63 to the pedestal 64.

The cabinet is rectangular in horizontal cross-section, and at its upper end (Figures 1 and 2) four similar handles 66 protrude upwardly and inwardly to where they meet an integral central ring 67. The top wall of the cabinet also slopes inwardly and upwardly toward a central round opening 68. This opening 68 forms a guide for a cylindrical glass window or inspection glass 69 that at its upper end is received in an annular channel 72 in the central ring 67.

Also seated in the channel 72, above the window 69 and a gasket 73 is an annular plate 74 that provides a structural support for three pairs 75, 76 and 77 of hinged baffle plates all of which normally depend downwardly as shown in Figure 1 from a structure comprising opposed pairs of vertical side walls 78 and 79 and from a central upwardly pointed fixed baffle member 82 carried by the aforesaid pair of vertical walls 78 and having a ridge 80 perpendicular to the plane of Figure 1.

Resting upon and secured to the top of the central ring 67 is a coin receiving member 83 that has a downwardly and inwardly flaring wall 84 to guide deposited coins to a central slot 85. This slot 85 is rectangular and disposed with its longest dimension over the ridge 80 of the pointed baffle member 82 so that a coin dropping through the slot 85 will be diverted to the right or left by the ridge 80, as viewed in Figure 1.

The function of the fixed and hinged baffle assembly is to prevent the removal of unregistered coins from the fare box by inverting it. The lower edges of each of the hinged baffle members is saw toothed as shown at 86 in Figure 2. A pair of screws, only one of which is shown at 87 in Figure 2, pass through the annular plate 74 and are threaded into the coin receiving member 83, to secure and clamp member 83 to the top of the ring 67 and to the plate 74.

In order to prevent the entrance of slugs, checks, or coins too large in diameter to be handled by the fare box, a gauge disc 88 (Figure 2) is secured to the bottom surface of member 83 as by a pair of screws, only one of which is shown at 89. This disc 88 has a rectangular slot 92 in alignment with the slot 85 of member 83 and the length of the slot is predetermined by the diameter of the largest coin intended to be handled by the fare box. For example if the fare box is not intended to handle quarters, a disc 88 having a slot 92 too short to pass quarters will be used. Thus if a quarter, half dollar etc. is deposited in the member 83 it will not be able to get past the gauge disc 88 and into the fare box to jam it. Instead, it will remain in member 83 from which it can be removed by hand. The gauge disc 88 may be changed for any other disc, depending upon the maximum diameter coin intended to be handled by the fare box. The cylindrical window 69 is retained in position against the channel 72 by a retaining ring 93 and gasket 94, secured against the lower edge of the window as by screws 95.

The coins that pass inside the window 69 are retained therein for inspection by the operator, and for dumping therefrom into the fare box for registering and sorting, by a mechanism now to be described.

Referring to Figure 2, an actuating rod or shaft 96 is journalled for longitudinal sliding movement in a pair of bearings 97 mounted in the sloping top wall of the cabinet, and in a fixed member 98 suitably secured as by screws or the like to the opposite side of the sloping cabinet top wall. The shaft 96 has a reduced section 99 upon which is mounted a compression coil spring 100 that resiliently urges the shaft 96 to the left as viewed in Figure 2. A push knob or handle 103 is mounted on left end of the shaft 96 where it protrudes beyond the top outer cabinet wall. Thus the shaft 96 can be pushed to the right, but as soon as the handle 103 is released it will move back to the left end of its stroke under the influence of spring 100.

A shaft 104 (Figures 1 and 2) is mounted above the actuating shaft 96 for pivotal movement in a vertical plane about a pivot 105 carried by the fixed member 98. The normal position of shaft 104 is horizontal as seen in Figure 2, but as will be explained, pushing in on the handle 103 will raise the shaft 104 in a vertical plane, while pivoting about 105, to a raised position indicated in dotted lines at 106 in Figures 1 and 2. Two bell cranks 107, only one of which is shown in Figure 2, have their apexes pivotally connected to the actuating shaft 96 by a through pin 108, there being one bell crank on each opposite side of the shaft 96. The longer leg 109 of each bell crank 107 is pivotally connected by a through pin 112 to the shaft 104. The arrangement is such that when the actuating shaft 96 is pushed to the right the shaft 104 will pivot clockwise about its pivot pin 105 to a raised position indicated at 106. The actuating rod 96 and the shaft 104 cooperate to actuate a coin dumping mechanism as will now be explained.

Referring to Figures 1, 2 and 23 a pair of semicircular plates 113 and 114 are disposed as best shown in Figures 1 and 2 in a plane adjacent the bottom of the cylindrical window 69. They have mating edges along a diameter indicated at 115 in Figure 23, disposed vertically above the shaft 104. The diameter of the assembled plates 113 and 114 is such that they make a horizontal closure adjacent the bottom of the window 69, for supporting coins or tokens for inspection.

A pair of angle members 116 have their horizontal legs affixed, as by spot-welding, to the underside of plate 113 adjacent its diametrical edge, and their vertical legs pivotally mounted upon the shaft 104, so that the plate 113 is pivotally mounted for rotation about shaft 104. Similarly the other plate 114 has a pair of angle brackets 117 with their horizontal legs secured to its bottom surface and its vertical legs pivotally mounted upon shaft 104. The arrangement is such that, without further support the outer or rounded edges of plates 113 and 114 would drop, with shaft 104 as the pivot, and there would be a substantial gap along the diameter 115 of the plates.

The plates are maintained in horizontal position by a pair of elongated studs or supporting arms 118 and 119 rigidly secured to the shorter and upwardly extending arms 120 (Fig. 2) of the pair of bell cranks 107, the arms 118 and 119 extending horizontally and outwardly from the planes of the bell cranks 107. When the knob 103 is pushed in by the operator, the shaft 104 is raised to the position indicated in dot-dash lines at 106 in Figures 1 and 2. The pivot pin 112 will be raised with respect to the two supporting arms 118 and 119 and the plates 113 and 114 will be raised so that their diameter 115 will be parallel with the new position of shaft 104 at 106. This will result in the plates 113 and 114 pivoting about shaft 104 as indicated by their dot-dash line positions indicated at 113a and 114a in Figure 1 while at the same time they will slope in a direction corresponding to the slope of shaft 104 when raised to the position shown at 106.

Thus each plate 113 and 114 slopes in two directions away from the horizontal, so that the coins which had been retained for inspection through the window 69 are dumped into the fare box singling, registering and sorting mechanism, as will be described.

Each of the two plates 113 and 114 is recessed along its mating edge on the diameter 115 as indicated at 123 and 124 in Fig. 23. An elongated plate 125 is secured as by spot welding to the top surface of plate 114 and completely bridges the gap formed by the recesses 123 and 124 when the plates 113 and 114 are in their normal or horizontal position. As best shown in Figure 1, this plate 125 also assures that when the plates 113 and 114 are in their raised position the coins will slide either to the right or left, and will not remain supported by the diametrical edges of plates 113 and 114, or fall between them, into the mechanism that raises or lowers them.

When the knob 103 is released, the spring 100 will return the actuating rod 96 to the left to its normal position, whereupon shaft 104 will resume its horizontal position and the supporting arms 118 and 119 will again support the plates 113 and 114 in horizontal position. It will be understood that even in the raised position of shaft 104, these supporting arms 118 and 119 limit the pivotal movement of the plates 113 and 114 about shaft 104.

As described in the copending application Serial No. 186,054 filed September 21, 1950 by Fount F. Daugherty for Fare Box with Grab Handle the four equally spaced handles 66 provide grips for passengers who are standing or for those who may be passing the fare box when the vehicle starts.

A light bulb 129 mounted within a reflector 132 secured to the top portion of the cabinet 50 illuminates the tiltable plates 113 and 114 and any coins that are resting thereon.

Figure 2 shows three windows 133, 134 and 135 in the side of the cabinet 50, through which are visible the numeral wheels of three counter assemblies indicated generally by the numerals 136, 137 and 138. These counter assemblies are actuated automatically by the fare box, as will be explained, to register respectively the totals of small tokens, coins and large tokens. A plate 139 carries legends indicating the specific items registered by the counter assemblies.

The front of the cabinet 50 has an elongated window 142 through which are visible two counter assemblies 143 and 144 (see also Fig. 3) which are selectively actuated by the manual depression of either of a pair of levers 145 and 146 protruding from the front of the cabinet. These counters and actuators are of any conventional type wherein the single depression of a lever actuates its respective counter to add a single numeral to the previous total. A plate 147 is secured to the frame of the machine as by screws 148 (Fig. 4) and masks all of the discs and numbers of the counters except for one row number of each, which rows are visible through the aforesaid window 142.

Protruding from the bottom portion of the front wall of the cabinet 50 is a change maker identified generally by the numeral 149. The particular construction of the change maker is unimportant as long as it has one vertical coin receiving barrel for each diameter of coin or token that may be handled, registered and sorted by the fare box. The change maker receives the sorted coins from the fare box, and stores them for the use of the vehicle operator or conductor. The particular change maker illustrated in the drawings is similar to that shown in the U. S. Patent 2,338,576 issued January 4, 1944 to Fount F. Daugherty, and need not be further described here, except that in the present instance there are six coin receiving barrels 152-157 (Fig. 1) instead of four as shown in the Patent 2,338,576.

Figure 14:
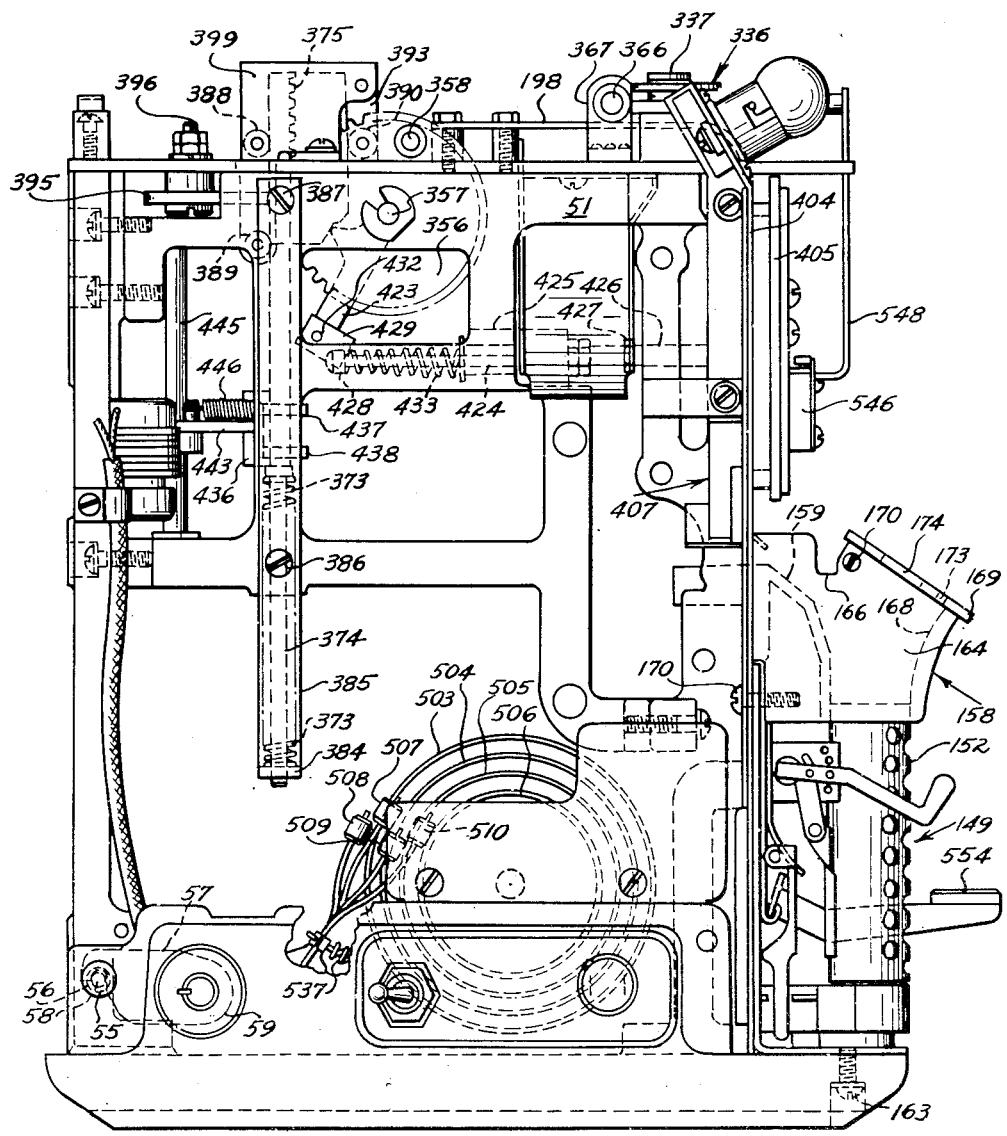
Figure 14 is a front elevation of Figure 12 and showing other associated elements.

As best shown in Fig. 14, and also in Fig. 1 the upper ends of the barrels 152-157 are received in an elongated casting 158. This casting has a pair of downwardly inclined surfaces 159 and 160 (Fig. 14) extending across the upper ends of the barrels 152-157 and serving to guide coins to the open top ends of the barrels after they have been discharged from the sorter mechanism. The casting 158 is secured to the machine frame as by screws 163 (Fig. 14) and has side walls 164 and 165 of the configuration shown in Fig. 14 with transverse recesses 166 along its upper edge. Between the side walls 164 and 165 are a series of dividing walls 167 (Fig. 1) all having the same configuration as the side walls 164 and 165, and having the function of guiding the sorted coins to their proper barrel after they have been dropped from the sorter, as will be understood. The casting 158 has a forwardly and upwardly flaring front wall 168 providing another series of chutes by which coins may be deposited into their proper barrels by hand, as after the operator has made change or the like. A cover plate 169 is hinged at its ends to the casting 158 by screws 170 (Fig. 14), the recesses 166 in the top edges of the side and dividing walls providing clearance for the upper edge of the cover plate 169 when it is raised. The cover plate is provided with a series of coin slots 173 directly over each of the barrels 152-157 so that the operator may deposit coins or tokens into their proper barrels, each of the slots 173 being of proper length to pass the proper coin. The cover plate also has an elongated window 174 through which the operator may watch the coins sorted by the fare box pass downwardly to their proper barrels.

Figure 10:
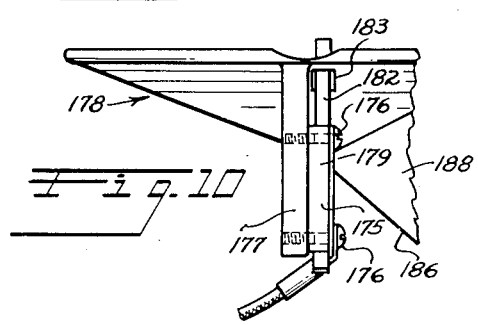
Figure 10 is a side elevation of the preferred coin hopper, showing the main control switch that is actuated by the coin dump mechanism.

As will be explained, pushing in the knob 103, besides actuating the mechanism to dump the coins from the plates 113 and 114, also serves to initiate operation of the motor that actuates the fare box. A main switch 175 (Figs. 5, 7 and 10) is secured as by screws 176 to a vertical leg 177 integral with and extending downwardly from an inverted pyramidal coin hopper 178. The switch has an actuating pin 179 (Fig. 7) that is normally urged outwardly by an internal spring (not shown) to close the switch. The switch is opened by pushing in the pin 179 against the action of the internal spring. A leaf spring 182 is suitably secured at its lower end to the body of the switch 175 so that the spring 182 extends substantially vertically upwards, in contact with the outer end of the actuating pin 179 and through a rectangular opening 183 in the wall of the coin hopper 178, to a point above the upper edge of the hopper where its free upper end bears against a stud 184 (Fig. 2) carried by and extending downwardly from the actuating rod 96. The internal spring in the switch 175 is strong enough to push the leaf spring away from the switch to close the switch when the rod 96 is moved to the right in Fig. 2, consequently carrying the stud 184 to the right. However, the return spring 100 on rod 96 moves the rod 96 back to the left when the knob 103 is released, and the stud 184 will push the leaf spring 182 back to overcome the internal spring in switch 175, push the pin 179 in, and open the switch. Care must be taken, when placing the cabinet 50 upon the fare box frame, that the knob 103 is pushed in while lowering the cabinet, to assure that the stud 184 will lie to the right of the leaf spring 182 as viewed in Figure 2. The top wall of the hopper is recessed as shown at 185 in Figs. 3 and 6 to assure clearance for rod 96.

The aforesaid inverted pyramidal hopper 178 is disposed directly beneath the coin reception and inspection receptacle formed by the cylindrical window 69 and the plates 113 and 114. The upper edge of the hopper will lie closely adjacent the inner surface of the frusto-pyramidal top of the cabinet, and an endless gasket (not shown) is advantageously secured as by cement, to the inner surface of the cabinet top wall to seal the space between that wall and the top edge of the hopper.

On one side, the hopper has means forming a fare passage or discharge chute formed partly by a bottom wall 186 (Figs. 3, 6 and 8) that is in effect a partial continuation of the oppositely disposed hopper wall 187. The chute has side walls 188 and 189 sufficiently spaced so as to allow large coins, such as quarters, to pass down the chute to the coin singling and gaging device which will be described later.

The chute side and bottom walls terminate at their bottoms in an integral member forming a platform 192 which when secured to the machine frame, holds the hopper in place by means of screws 193, 194 and 195. These screws, besides passing through the platform 192, pass through spaced guide plates 196 and 197 (Fig. 13), through a coin plate 198 (Figs. 5 and 13) and through spacing washers 202, 203 and 204, and are threaded into a horizontal member 205 of the internal frame 51, the spacing washers serving to position the coin plate 198, the guide plates, and the hopper 178 at the proper elevation with respect to the internal frame.

The sloping walls of the hopper direct coins to the aforesaid chute, as will be understood. Means are provided to agitate the coins in the hopper so that they will fall into the chute, the same means serving to reject from the chute those articles which exceed a predetermined thickness, such as a button, or a coin which is bent or deformed to such a degree that it might jam the coin singling and sorting apparatus. This agitating and rejecting means, in the illustrated embodiment, is in the form of a rubber wheel 208 having a pair of spaced toothed sections 206 and 207. The wheel is secured to a rotating shaft 209 by a set screw (not shown). As best shown in Figs. 6 and 8 the peripheries of the two toothed sections 206 and 207 are but slightly spaced from the bottom wall 186 of the chute, and are driven at high speed in a counter-clockwise direction as viewed in Fig. 6. The clearance between the sections 206 and 207 and the bottom wall 186 is such that bent coins, buttons, slugs or other articles that are so thick as to jam the sorting mechanism, will not be able to pass the wheel 208, but instead will be thrown back up into the hopper. Also, stacked coins cannot pass in the wheel because the thickness of two of even the thinnest coins will be too great for passage beneath the wheel, and the upper one will be thrown back up into the hopper. A shield 212 covers the upper end of the coin chute above the rubber wheel 208, to form a continuation of the hopper wall 213 (Fig. 3). The shield has a finger 214 that projects into the space between the toothed sections of the rubber wheel. Thus the shield 212 with its finger 214 assure that coins will not drop into the coin chute without first falling into the hopper and then passing beneath the rubber wheel 208.

As each coin passes beneath the rubber wheel 208 it is arrested momentarily by a contact 215 (Fig. 6) that protrudes vertically through a hole 216 in the chute bottom wall 186. This contact is automatically depressed with every coin singling stroke of the mechanism shown in Fig. 13, thereby releasing the coin that is arrested by the contact.

*The motor and drive shaft*

The fare box is powered by an electric motor 218 (Fig. 19) suitably secured to the bottom of the internal frame 51. The motor has a reduction gear box which journals the lower end of a vertical output shaft 221 (Fig. 20) which passes through a housing 222 and carries adjacent its upper end a triple toothed circular ratchet 223 (Fig. 20). A driven shaft 224 is mounted coaxially above the motor output shaft 221, being journalled in a pair of horizontal internal frame members 225 and 226. The driven shaft 224 is releasably connected to the motor shaft 221 by a clutch mechanism now to be described.

Secured to but rotatable upon the lower end of the driven shaft 224, where it adjoins the upper end of shaft 221 and the ratchet 223, is a plate 227, best shown in Figs. 20 and 21, having a spiral periphery that includes one radial lip or notch 228 forming a stop. A semi-circularly curved plate 229 (Fig. 20) is secured to the bottom of the plate 227 by a pivot pin 232 so that the curved plate lies against the under surface of plate 227 and can rotate about pin 232. This rotational movement is limited by a pin 233 fixed to the upper plate 227 and protruding through a short slot 234 in the pivoted plate 229. The free end of pivoted plate 229 is thereby limited to a movement between its full line position shown in Fig. 20 and the dotted line position shown at 229a. The pivoted plate 229 has at its free end a radial lip 235, which when the plate 229 is in its dotted line position 229a, is coplanar with the radial lip 228 of the plate 227.

A bell-crank shaped pawl having legs 236 and 237 is pivotally secured to the bottom of plate 227 by a pin 238. A tension spring 239, secured to the pin 233 and to a pin 242 on the pawl, urges the pawl counter-clockwise as viewed in Figure 20 so that the outer end of its leg 236 is in the path of the teeth on the ratchet 223. The spring 239 is sufficiently strong to cause the leg 237 of the pawl to exert a camming action on the free end portion of plate 229 to normally maintain the plate 229 in its full line position shown in Fig. 20. It will be apparent that under these conditions there is a positive drive connection between the motor shaft 221 and the plate 227. This drive can be disconnected by rotating the plate 229 counter-clockwise as viewed in Fig. 20 so that by a camming action it overcomes the acttion of the spring 239 and rotates the pawl clockwise, thereby moving its leg 236 to the dotted line position 236a where it is out of the path of the teeth on the ratchet 223.

Referring to Fig. 19 a bell crank having legs 243 and 244 is pivotally secured to a member 245 of the internal frame by a pivot 246. A tension spring 247 urges the bell crank clockwise as viewed in Fig. 19, against a stop member 248 secured to the frame as by a screw 249. As shown in Fig. 20, the end of the crank arm 243 lies in a vertical plane in the path of the radial lip 235 on curved plate 229 and the radial lip 228 or stop on the plate 227, when the crank arm 243 is in the fully raised position shown in Fig. 19. Thus, assuming that the ratchet and pawl are in driving engagement, in their clockwise rotation as viewed in Fig. 20, first the lip 235 will hit the arm 243 to disengage the ratchet and pawl mechanism and then the lip or stop 228 on the plate 227 will hit the arm 223, thus stopping the plate and entirely discontinuing the transfer of power to the driven elements of the fare box, allowing the motor to coast to a stop if it has been deenergized at the same time.

The motor shaft 221 has affixed thereto for rotation therewith a disc 252 (Fig. 19) having a series of three cams depending downwardly from its periphery. The bell crank arm 243 has a pin 254 protruding therefrom, which when the arm 243 is in the raised position of Fig. 19, lies in the path of the cams 253. In Fig. 19 one of the cams is shown about to engage the pin 254. Upon energization of the motor 218 rotation of the cam 253 will depress bell crank arm 243 against the action of spring 247 and the arm 243 will release the lips 235 and 228. Spring 239 will thereupon engage the pawl leg 236 with the ratchet 223 so that the plate 227 will be positively driven through one revolution, whereupon the bell crank arm 243 will again disengage the positive ratchet and pawl clutch mechanism.

Figs. 21 and 22 show an overload release clutch mechanism which prevents damage to the machine in the event of a jam therein. In Fig. 21 is shown a pair of curved lever arms 255 and 256 pivotally secured to the top of the plate 227 by a pair of screws 257 and 258. A tension spring 259 urges their free ends together. Counterclockwise rotation of lever 255 is limited by a stop screw 262 passing through a stud 263 fixed to the plate 227. The other lever 256 carries a roller 264 free to rotate on a pin 265. The roller 264 bears against the periphery of a cam disc 266 above the mechanism shown in Fig. 21 and fixedly secured to the driven shaft 224, and normally is seated in a depression 267 in the periphery, being resiliently held therein by the spring 259, with a force sufficient to transmit normal forces to the disc 266. In the event of a jam in the machine the roller will merely ride up out of the depression 267 thereby ceasing to transmit rotation. The roller can circle the plate 266, riding into and out of the depression 267 thereby ceasing to transmit rotation. The roller can circle the plate 266, riding into and out of the depression 267 until the motor 218 is deenergized.

Above the cam disc 266 is fixedly secured to the shaft 224 a bevel gear 268 which drives the coin and token counter mechanism through a bevel pinion 270 (Fig. 29). This counter mechanism will be described later. Secured to the shaft 224 for rotation therewith, above the frame member 225, is an elongated cam 269 having a profile as shown in Figure 22a, and a functtion to be described later.

Figure 12:
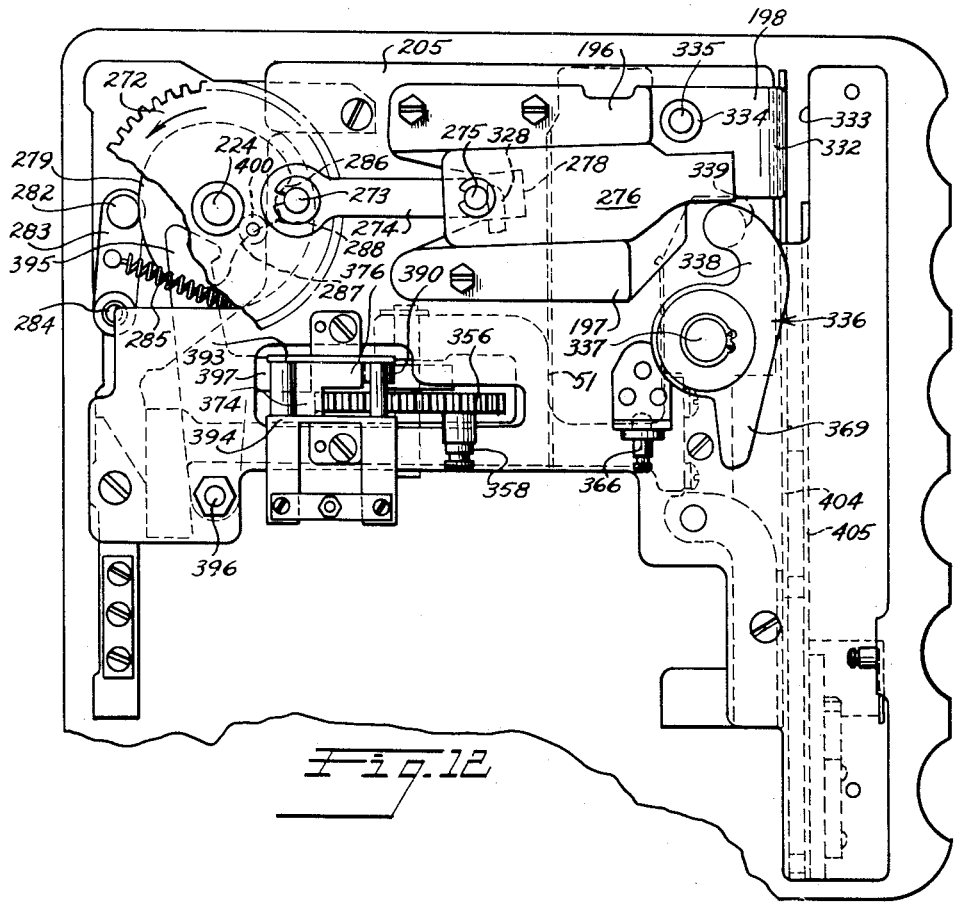
Figure 12 is a top plan view of a portion of the machine showing the coin ram assembly and coin gage.
Figure 13:
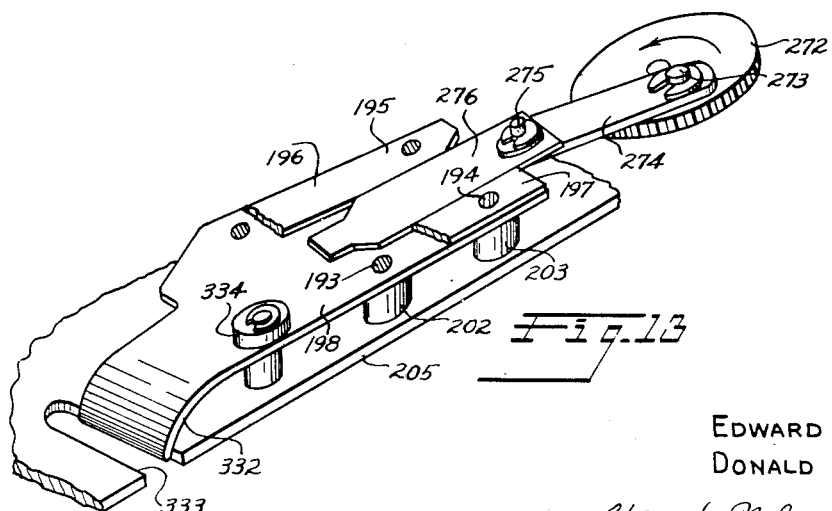
Figure 13 is a perspective view of the coin ram assembly shown in Figure 12.

Suitably affixed to the top of the driven shaft 224 for rotation therewith is a gear 272 that has a stud 273 protruding from its upper surface which serves as a crank-pin for driving a connecting rod 274 that in turn is connected by a pin 275 (Figure 13) to a coin ram 276 that is guided for rectilinear motion by the guide plates 196 and 197 (Figure 13). The coin ram is confined against vertical movement by the bottom surface of the platform 192 and the top surface of the coin plate 198 (Figure 5), and the underside of the platform 192 has a central recess 277 (dotted in Figure 5) to provide clearance for the pin 275. The coin plate 198 is also recessed as shown at 278 (Figure 12) to provide clearance for the pin 275 and the right or forward end of the connecting rod 274 when at the forward end of its stroke. Figure 12 shows the coin ram 276 at the full end of its working stroke, and in its normal zero or withdrawn position, which it occupies when the clutch mechanism is as shown in Figure 19, the stud or crank pin 273 is 180 degrees away from the position shown in Figure 12.

Figure 16:
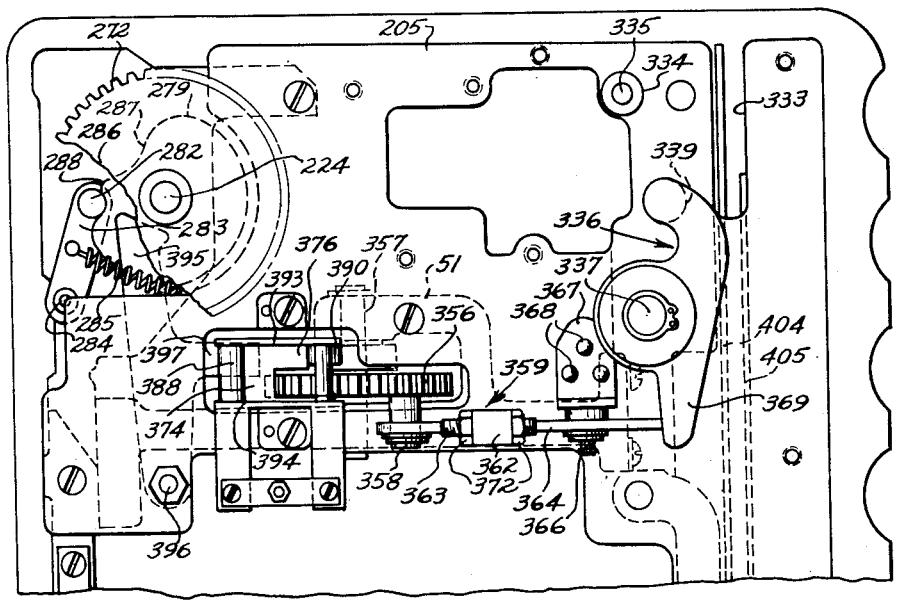
Figure 16 is a top plan view somewhat similar to Figure 12, but with some parts omitted and other parts shown.

Secured to the driven shaft 224 below the gear 272, but above the frame member 225 is a plate cam 279 having a profile best shown in Figures 12 and 16. A cam follower 282 is carried by a lever 283 pivoted to the internal frame 51 by a pin 284 and urged clockwise by a tension spring 285. The cam 279 has a first depression 286 which by means of the cam follower 282 and spring 285 resiliently holds the shaft 224 in such position that the stud or crank pin 273 is in its zero or withdrawn position shown in Figure 16. The follower 282 thus assists in holding the driven shaft 224 in the position that it occupies before a rotation cycle or series of cycles. The cam 279 has a second depression 287 separated from depression 286 by a rise 288 (Figure 16). The action of the plate cam 279 is such that after rotation of shaft 224 is initiated by the motor, further rotation beyond the rise 288 is assisted by the slope of the cam profile toward the second depression 287. This occurs during a portion of the cycle wherein the load on the motor is relatively high, and the additional torque provided by the action of the spring pressed cam follower 282 at this point smooths out the motor load.

A vertical bracket having two walls 289 and 290 (Figures 3 and 5) is secured to the top of the horizontal frame member 205 as by three screws 293 (Figure 3) passing through horizontal legs 294 and 295 at the bottom of the vertical bracket. A vertical shaft 296 (Figures 3 and 5) is journalled for rotation in bearings in the frame member 205 and in a horizontal lip 297 protruding inwardly from the bracket wall 290. Adjacent its bottom the shaft 296 has a pinion gear 298 (Figure 3) that meshes with the gear 272, thereby driving shaft 296 at a much greater speed than the driven shaft 224. Adjacent the top of shaft 296 is a bevel gear 299 (Figure 5) that meshes with a mating bevel gear 300 fixed to a short shaft journalled in vertical wall 290. The same shaft has affixed to it a gear 303 that drives a gear 304 on shaft 209 through an idler gear 305 (Figure 3) mounted on stub shaft 306. Bevel gears 299, 300, gear 303, idler 305 and gear 304 thus provide the rotative power for shaft 209 that drives the rubber wheel 208 in the hopper discharge chute.

Also secured to the shaft 296 but below the bevel gear 299 is a worm 307 (Figure 5) which meshes with a worm wheel 308 (Figure 3) upon a shaft 309 fixedly secured to the bracket wall 289. Suitably keyed to worm wheel 308 is a hard rubber or Bakelite cam 310 having a circular profile except for a single depression 311 (Figure 3a. An electric switch 314 is suitably secured to the bracket vertical wall 289. This switch has a plunger 315 that when pressed inwardly against the force of an internal spring, closes the circuit in which the switch is located. A lever 316 is pivotally secured to the switch body at a pivot 317, and at its other end carries a cam follower roller 318 that rides on the periphery of the cam 310, being resiliently pressed thereagainst by the switch plunger 315. In the position shown in Figure 3a the plunger 315 is pushed in and the switch 314 is closed. The cam 310 rotates counter-clockwise once for every 13 revolutions of the large gear 272 that actuates the coin ram 276 and the function of the cam 310 and switch 314 is to assure that the power circuit to the motor, once closed, will operate the coin ram 276 at least 13 times, before the depression 311 allows the cam follower 318 and lever 316 to release plunger 315 and open the switch 314. If after these 13 operations of the coin ram the motor circuit is still energized by another parallel switch, then cam 310 will be rotated again and will again open the switch 314 after 13 operations of the coin ram.

It may be explained at this time that the motor is initially energized by pushing in the knob 103 to dump the coins into the hopper, because this action closes the main switch 175 (Figure 7) as previously explained. Switch 314 is in parallel with the main switch 175 and thus maintains a holding circuit to energize the motor while the coin ram 276 makes 13 operations. If all of the coins dumped into the hopper have been discharged from the hopper chute then the motor will become deenergized at this time. However, if a coin is still retained in the coin chute by the protruding contact 215 of Figure 6 then the motor circuit will be again closed through contact of the coin with the chute bottom 186 and with the contact 215. The holding circuit established by the switch 314 and cam 310 will thus again cause the motor to drive the coin ram through 13 operations.

Figure 9:
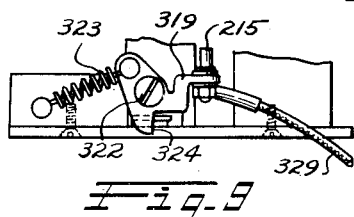
Figure 9 is a side elevation of the preferred coin stop pin assembly as viewed from the right of Figure 6.

Operation of the protruding contact 215 is as follows. Referring to Figure 9, the contact 215 is mounted upon one leg of a bell crank 319 pivotally attached to an element of the coin chute by a screw 322. A tension spring 323 urges the bell crank 319 counter-clockwise to its normal position wherein the contact 215 protrudes above the floor 186 of the chute to prevent passage of a coin therepast. A bottom vertical lip or edge 324 on the bell crank 319 engages one end 325 of a horizontal lever pivotally mounted upon a pin 326 (Figure 7) for rotary reciprocating movement within a slot 327 in the underside of the platform 182, so that the lever operates in a plane just above the top of the coin ram 276 and with the other end 328 of the lever in the path of the pin 275 (Figures 12 and 13). The aforesaid lever is urged clockwise, as viewed in Figure 7, by the action of the spring 323 and the bell crank carrying the contact 215, so that its normal position is as shown in Figure 7, with the limit of the clockwise movement of arm 328 established by the left wall of the slot 327. The lever is so located along the path of the aforesaid pin 275 that the pin strikes the arm 328 just before the pin reaches the end of its stroke (towards the right as viewed in Figure 12), and the pin 275 will thus move the lever arm 328 counter-clockwise (Figure 7) to rotate the bell crank 319 (Figure 9) clockwise against the tension of spring 323, and thus pull the contact below the floor of the coin chute to permit the next coin to slide to the bottom of the chute. The contact 215 is insulated from the bell crank 319 that carries it, and a wire 329 leads from the contact to one side of the motor circuit, the other side of the motor circuit being grounded.

*Coin singling and gaging mechanism*

As each coin is released by the depression of contact 215, it slides the remaining way down the coin chute and falls upon the top of the coin ram 276, which is at this time at the full end of its working stroke, as viewed in Figure 12. The bottom of the coin chute wall 189 (Figure 3) just clears the top of the ram 276, and during the return stroke of the ram the coin will be wiped off the top of the ram by this wall 189, and will drop onto the elongated coin plate 198 where it now lies in the path of the next working stroke of the ram 276. As shown in Figures 5 and 13 the left or discharge end of the coin plate 198 curves downwardly at 332 to permit the coins to drop vertically through a slot 333 in the horizontal frame member 295. During the working movement of the ram 276 the coin resting upon the coin plate will thus be pushed to the left until it drops into the slot 333 and enters the sorting mechanism in a vertical plane.

Figure 11:
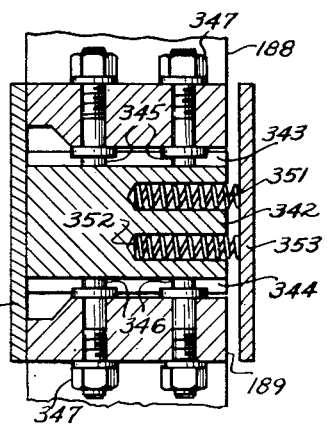
Figure 11 is a vertical section through the spring pressed coin gate, taken along the line 11—11 of Figure 7.

During this movement the coin is pushed between a fixed roller 334 mounted upon a stud 335 and a movable stud 339, to be described, the roller forming a fixed gaging element. On the other side of the path of the coins is a movable gaging element in the form of a bell crank 336 (Figure 12) pivotally mounted upon a fixed stud 337 secured to the frame member 295. One arm 338 has the previously mentioned stud 339 depending therefrom (Figures 15 and 18) so that the stud is in the path of the coins being pushed by the coin ram toward the slot 333, and it will be apparent that the clockwise movement of the gaging element 336 will in each instance be dependent upon the diameter of the particular coin being gaged between the fixed roller 334 and the stud 339 on the bell crank 336. It takes considerable force to push a coin between the stationary and movable gaging elements, and although the pushing end of the coin ram is flat there is the possibility that a coin would cock out of its horizontal position. Also, it must be assured that only a single coin at a time is pushed through the gaging elements by the ram 276. For that reason, a vertically movable gate 342 (Figures 3, 5, 7 and 11) is provided. The gate 342 lies transverse of the path of the coins that are being pushed through the coin gaging elements by the coin ram and comprises a block of metal having vertical slots 343 and 344 (Figure 11) each of which has protruding thereinto a pair of studs 345 and 346 respectively. As best shown in Figure 11, these studs are adjustable through the walls 188 and 189 of the chute, and are secured by locknuts after the studs are adjusted to provide a free vertical movement for the gate 342. As best shown in Figure 7, the face 348 of the gate toward the ram is in the form of a segment of a cylinder, which at its lower edge is undercut in a smooth curve toward the opposite vertical face of the gate 342 to provide a camming surface that causes the gate to be lifted when a coin is forced against its curved face 348 adjacent the bottom thereof. The gate 342 normally rests upon the coin plate 198 and is spring pressed thereagainst by a pair of coil springs 351 and 352 (Figure 11) seated in blind bores in the gate 342, and with their upper ends bearing against a horizontal leg 353 of an L shaped hold down bracket that is secured by its vertical leg 354 and a pair of screws 355 (Figure 5) to the front faces 188 and 189 of the coin chute. As shown in Figure 11 there is a clearance space between the top of the gate 342 and the leg 353 of the hold down bracket, to permit the gate to rise when a coin passes beneath it. Besides preventing the cocking of a coin the gate 342 also provides a singling device that prevents the ramming of more than the lowermost coin if there be two or more coins resting upon the coin plate 198. In order to assure that a coin passes the coin gate, the leading edge of the ram 276 in its ramming action, also passes beneath the coin gate, thus preventing the holding of a coin beneath the gate as a result of the action of the springs 351 and 352.

Coin sorting mechanism

Among the mechanisms controlled by the clockwise movement of the coin gaging element 336 is the coin sorting mechanism which receives the coins or tokens passing vertically through the slot 333, sorts them according to diameter, and delivers them to the proper barrel 152—157 in the change maker 149. The mechanism for controlling the sorter will first be described.

Figure 17:
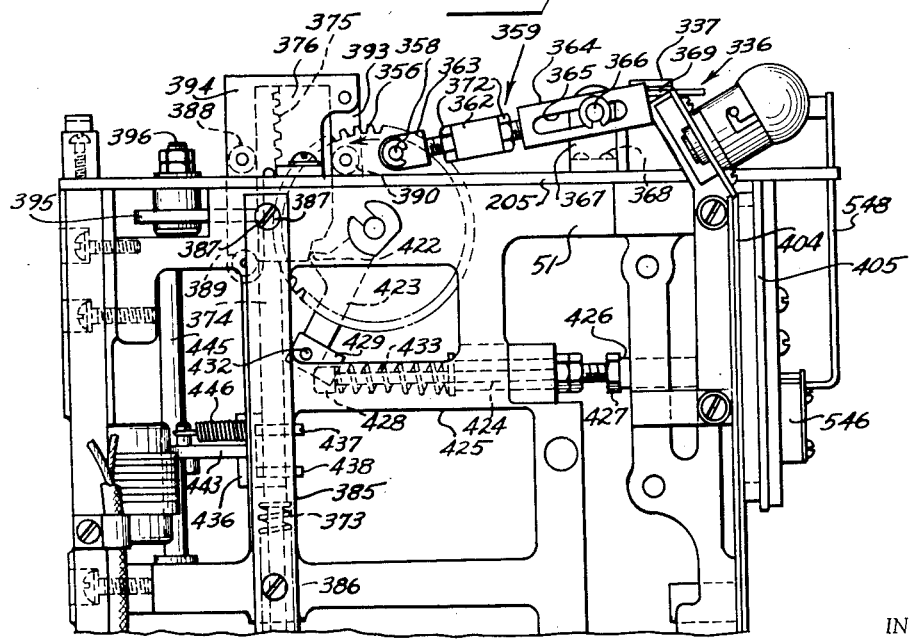
Figure 17 is a front elevation of Figure 16.

Referring particularly to Figs. 16 and 17, a gear 356 is affixed to a horizontal shaft 357 journalled for rotation in spaced elements of the frame 51 below and supporting the horizontal frame member 205. This gear 356 does not rotate through a large angle, and adjacent its top it carries a stud 358 upon which is mounted one end of a connecting rod 359 that is adjustable in length. The connecting rod 359 includes an elongated nut 362 which threadedly receives one end of an eye bolt element 363 the other end of which is pivotally mounted upon stud 358. Another element 364 has one end threadedly received in the other end of the elongated nut 362, the other end having an elongated slot 365 through which passes a stud 366 which is carried by the vertical leg of an angle bracket 367 that is rigidly secured to the top of frame member 205 as by rivets 368. Thus the connecting rod 359 has a pivotal mounting upon gear 356 at one end and a sliding mounting upon stud 366 adjacent the other end, which said other end lies in the path of the movement of the other leg 369 of the bell crank or gaging element 336. Lock nuts 372 upon the threaded sections of connecting rod elements 363 and 364 assure the maintaining of the proper adjusted length of the connecting rod, it being understood that the internal threads in the ends of elongated nut 362 are of opposite hand whereby the length of the connecting rod can be adjusted by turning the nut 362 after the locknuts 372 have first been loosened. It will be apparent that whenever the gaging element 336 is rotated clockwise (Fig. 16) during the gaging of a coin, the gear 356 will be rotated counter-clockwise (Fig. 17) through a commensurate angle. Return movement of these elements to their initial positions is spring influenced, as will be described.

Shown in enlarged detail in Figs. 25 and 26 is an assembly that is mounted in the internal frame 51 of the machine for reciprocating vertical movement under the influence of the gear 356 and a return spring 373 (Figs. 14 and 17). This assembly includes an elongated square rod 374 having rack teeth 375 on the upper portion of its length, which teeth are in engagement with the teeth of gear 356. It is pointed out now that in order to show more clearly the elements carried by rod 374, the positions of the rod 374 and the elements carried thereby are viewed from an opposite direction in Figs. 25, 26 and 27 than in Figs. 14 and 17.

Securely fastened to one side of the rod 374 and at the top thereof as by rivets 377, is a cam plate 376 that is shown in still larger detail in Fig. 27. Along one edge the cam plate 376 has a series of notches of varying depths and having horizontal lands 378—383 inclusive, one for each size of coin or token to be handled by the fare box, as will be apparent later. At its lower end the rod 374 is round in section, and guided by a hole in a horizontal flange 384 at the bottom end of a vertical flat plate 385 that is secured to a vertical member of the internal frame 51 as by screws 386 and 387 (Figs. 14 and 17). The upper end of the assembly 374 and 376 is guided by a set of three rollers 388, 389 and 390 (Figs. 14 and 17) that are carried by parallel spaced frame members 393 and 394 (Fig. 16) secured to internal frame 51 and which also act as side guides for the top of the rod-plate assembly 374, 376. The coiled compression spring 373 on the round section of rod 374 bears against the flange 384 and against the bottom of the square section of rod 374 to urge the rod upwardly. Thus when the coin gaging element 336 acts to rotate gear 356 counter-clockwise (Fig. 17) and to lower the rod 374 through the rack 375 this movement is resisted by spring 373.

Each coin or token of different diameter operates the gaging element 336 to lower the rod 374 by varying amounts that are dependent upon the coin or token diameter. Shown best in Fig. 24 is a lever 395 pivoted for movement in the horizontal plane about a pivot 396 carried by the horizontal frame member 205. The lever 395 has a projecting arm 397 (see also Fig. 27) that terminates in a chisel end 398 that is squared at its end to avoid a sharp and relatively weak point. The underside of the end 398 is horizontal. The lever 395 is urged clockwise (Fig. 24) into engagement with the serrated edge of the cam plate 376 (see Fig. 27) by a tension spring 399 (Fig. 24), so that as the cam plate 376 is depressed by the action of the gaging element 336 the chisel end 398 of the projection will enter the notches of the cam plate. As the depression of the cam plate 376 depends upon the coin diameter the vertical spacing of the lands of the notches in the cam plate is commensurate with the coin diameter. As shown in Fig. 27 the notches have camming surfaces above each land 378—383, so that the spring urged projection 397 will ride over the successive notches until the cam plate has reached the maximum depression according to the coin that has been gaged, whereupon the end 398 of the projection 397, being spring pressed to the left (Fig. 27) will engage the particular land corresponding to the gaged coin, and hold the cam plate 376 and the rod 374 in that depressed condition until released for return to initial position under the influence of spring 373.

The withdrawal of the projection 397 from the notch, and the return of the rod 374 to initial position is not accomplished until the succeeding ramming cycle of the coin ram 276, because after the rod 374 has been depressed according to the coin diameter it is the function of the lever 395 and its spring 399 to hold the rod 374 depressed until the gaged coin has been sorted and delivered to its proper coin barrel in the change maker 149, and until the value of the coin or token has been entered in the register visible through the windows 133—135 of Fig. 2. This withdrawal of the projection 397 from the notches, and the consequent return of rod 374 to initial position is accomplished at the start of the next coin singling and gaging cycle by the action of a stud 400 (Fig. 5) that is secured to the gear 272 and protrudes downwardly therefrom so that it engages a cam surface 403 on the end of the lever 395. As seen in Fig. 12, when the ram 276 is in its initial position, before the beginning of a working stroke, the stud 400 is but slightly spaced from the cam surface 403, so that as soon as the gear 272 rotates only a few degrees the stud 400 will engage the cam surface 403 to release the projection 397 from the notches and allow the rod 374 to return to its uppermost position, after which it will be depressed again as the next coin pushed by the ram 276 passes between the gaging elements 334 and 339.

Figure 15:
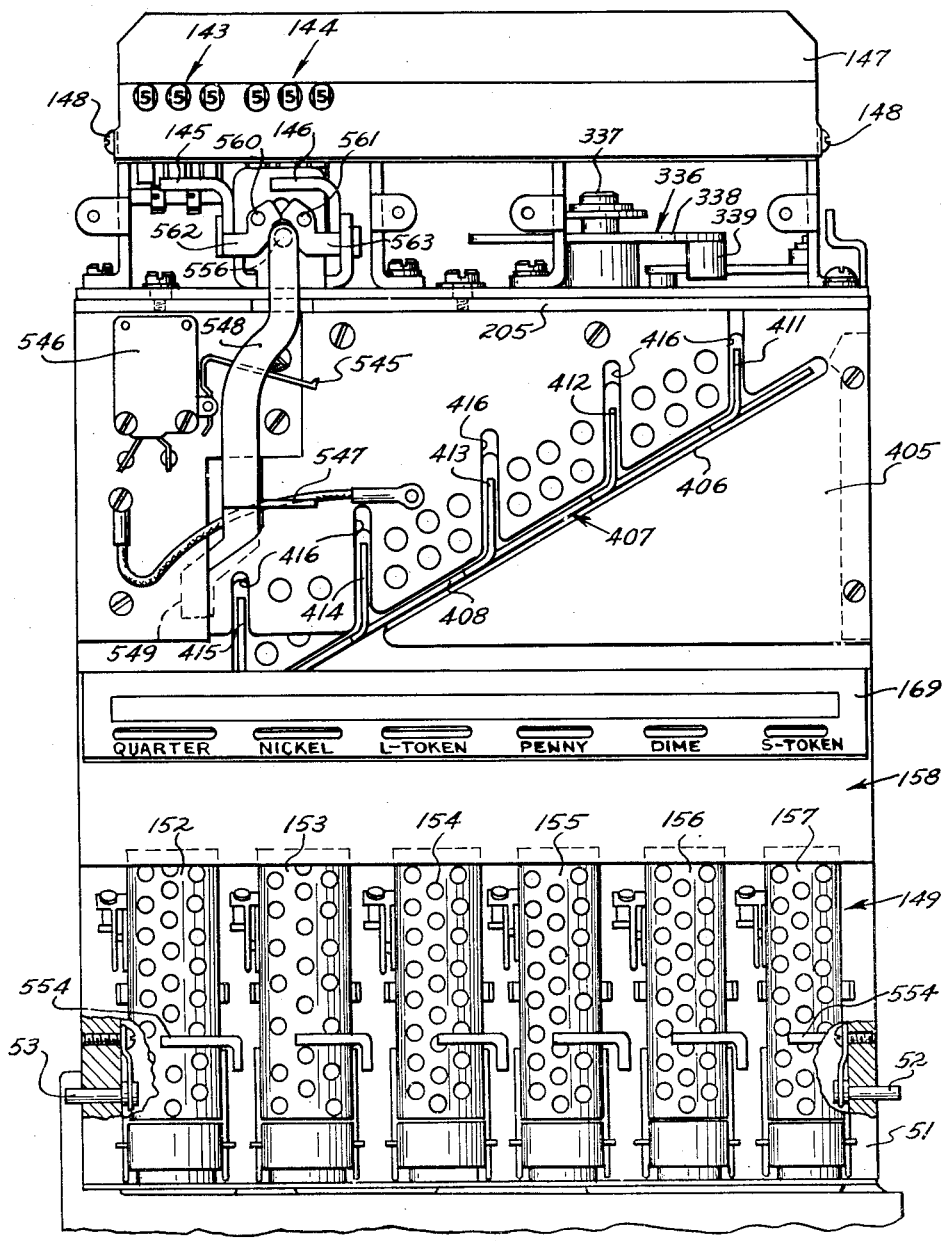
Figure 15 is a side elevation of Figure 14 as seen from the right thereof.

As each coin is gaged and is pushed to the end of the coin plate 198 to enter the slot 353 in vertical position, it enters a space between a pair of parallel spaced vertical walls 404 and 405 (Figs. 5, 12, 14 etc.). As best shown in Figs. 4, 15 and 18, these walls 404 and 405 have transverse parallel sloping slots 406 therethrough. A sorter leaf plate 407 (see also Fig. 28) passes through these slots to form a sloping floor 408 between the aforesaid vertical walls 404 and 405. This sloping floor is reciprocable, by means to be described through a range of positions between which a small token will drop into barrel 157 to a position where a quarter will drop into the barrel 152. These positions occur as the floor 408 is shifted from its initial position to the right (in Fig. 12) until it reaches its maximum deflection whereupon a quarter will roll along the floor until it drops off the end 409 thereof (Fig. 28) into the quarter barrel 152. As perhaps best shown in Figs. 15 and 28, the floor is stepped so that along its length it has various widths, and at the lowermost end of each of the stepped widths it is provided with vertical stops 411–415 just above each of the dividing walls 167 in the casting 158, the walls 404 and 405 being provided with spaced vertical slots 416 (Fig. 15) so that the stops 411–415 can move transversely through the walls 404 and 405.

The action of the sorter leaf plate 407 is such that, for example when a nickel has been gaged, the plate will move to the right (Fig. 12) or downward (Fig. 28) until the stop 415 blocks the sloping passageway between the vertical walls 404 and 405 while the stepped floor 408 is discontinued just above the space leading to the nickel barrel 153.

The movements of the sorter leaf plate 407, which delivers each coin to the coin barrels 152–157 in accordance with their diameters, is controlled by the gaging element 336, the adjustable connecting rod 359, the movements of gear 356, and the cam plate 376 of the assembly shown in Figs. 25 and 26. As best shown in Figs. 25 and 27, one edge of the cam plate 376 has a working profile which in the illustrated embodiment has three differently sloping sections 417, 418 and 419. These sloping sections, which constitute the working profile, are continuously engaged by a protrusion 422 (Fig. 17) on a lever 423 that is pivoted for free rotation about the same shaft 357 as the gear 356. A reciprocable rod 424 (Figs. 14 and 17) is journalled for horizontal sliding movement within an element 425 of the internal frame 51. At its rightmost end in Figs. 14 and 17 the rod 424 is threaded into a thickened abutment 426 (Fig. 28) that is integral with the sorter leaf plate 407. A locknut 427 (Figs. 17 and 28) secures the adjusted position of the rod 424 with respect to the abutment 426 and the sorter plate 407. At its other end the rod 424 has an enlarged head 428 (Figs. 14 and 17) that is received within a bifurcated saddle 429 that is pivotally secured, as by a pin 432 to the lower end of the lever 423. A coiled compression spring 433 (Figs. 14 and 17) on the rod 424 urges the rod to the left, with its enlarged head 428 in engagement with the lower end of the lever 423. The saddle 429 serves to guide the end of rod 424 and to keep it from slipping sideways from engagement with the lower end of the lever 423. Thus by means of the spring 433 the rod 424 that is rigidly connected to the sorter plate 408 is resiliently urged to the left (Figs. 14 and 17) into engagement, at its enlarged head 428, with the lower end of the lever 423, consequently urging the protrusion 422 into continuous engagement with the working profile sections 417–419 of the cam plate 376. By this construction the gaging element 336 controls the position of the cam sorter plate 407 in accordance with the coin diameter, during a sorting operation. It should be understood that when the sorter plate is positioned in accordance with the diameter of a gaged coin measured by the gaging element 336 it will remain in that gaged position by reason of the engagement of projection 397 on lever 395 until the next cycle of operation of the machine, whereupon the projection 397 will be disengaged from the notches 378–383 by the action of the stud 400 on gear 272 and springs 373 and 433 will return cam plate 376 and sorter plate 407 to their initial or zero positions before they are again positioned to sort the next coin according to its diameter.

*Coin and token registering mechanism*

Secured to the square rod 374 as by rivets 434 (Fig. 26) is a bracket member 435 that includes a vertical element 436 from which protrude a pair of spaced parallel horizontal legs 437 and 438 (Figs. 17 and 25) through which passes a vertical pin 439 that provides a pivot for a lever 442. Another lever having legs 443 and 444 (Fig. 22a) is pivoted about a vertical shaft 445 and is also vertically slidable upon the shaft 445. The lever 442 and the left 444 of the other lever are connected by a tension spring 446 that resiliently urges both said elements against the cam 269, at points spaced substantially 180 degrees apart, as best shown in Fig. 22a. The bracket member 435, secured to the square rod 374, moves vertically with the aforesaid rod in accordance with the diameter of the coin being gaged. The other lever, slidable on shaft 445 moves vertically with the square rod 374 by reason of the fact that its leg 443 is engaged in a horizontal slot 447 in the vertical element 436 of the bracket member 435.

The normal position of the lever 442 and of the lever on shaft 445 is as shown in Fig. 22a, this position occurring before a cycle of operation of the gear 272 and the coin ram 276. The cam 269, carried by the driven shaft 224 rotates counter-clockwise as viewed in Figure 22a, and as a consequence it first rotates lever 442 clockwise, and then lever leg 444 counter-clockwise, against the force of spring 446, during one revolution of the driven shaft 224. This will occur no matter what the vertical position of the square rod 374 because the cam 269 is elongated along the axis of the driven shaft 224 as best shown in Fig. 19.

The outer end of lever 442, on the opposite edge from that engaging the cam 269, is narrowed to provide a lip 448 that selectively engages and depresses one of six levers 451–456 (Fig. 31) of the register mechanism to effect the totalization of either coins, tokens or the like that are being gaged and sorted. Levers 451, 453 and 454 are pivoted upon an elongated pin 457. The lever 453 effects the registration of pennies into the central or coin counter 458 (Fig. 29) visible through window 134 through the medium of an integral leg 459 (Fig. 32) at right angles to lever 453, and having a pivotal connection 462 (Fig. 32) to a spring (463) pressed pawl 464 the free end of which engages the teeth of a circular ratchet 465 that drives the units wheel 466 of the coin counter 458. Return to the right (Fig. 32) of the pawl 464 is by a spring 467 connected by pin 468 to the lever leg 459. A conventional carry-over mechanism rotates the tens wheel 469 one tenth of a revolution for every complete revolution of the units wheel 466. A spring (472 Fig. 30) pressed detent lever 473 having roller 474 engages serrations in a stop wheel 475 to hold the units wheel 466 while the pawl 464 rides backward over the teeth of the ratchet wheel 465, and also holds the said units wheel against rotation except by the influence of pawl 464.

The upper lever 451 when depressed, actuates the upper, or small token register 476 in the same manner to register and add small tokens, the lever 451 being connected to a right angled leg 477 by an integral tube 478 mounted upon the elongated pin 457. In a similar manner, tube 479, on pin 457 is integral with leg 481 and when lever 454 is depressed by the lip 448 on lever 442, the leg 481 actuates the lower or large token register 480 to total the large tokens that are gaged and sorted.

The registration of dimes, nickels and quarters into the coin counter 458 is accomplished as follows, by the selective depression of levers 452, 455 or 456, all pivoted upon a single pin 462, in combination with the rotation of bevel gear 270, driven by the large bevel gear 268 on the driven shaft 224. Since the large gear 268 will rotate through one revolution for each rotation of the driven shaft 224, the small gear 270 will rotate a greater number of revolutions. The small gear 270 is on a shaft 486 journalled in the side walls 483 and 484 of the register frame. Five spacer bars 485 (Fig. 32) separate these side walls. A drive gear 487 is mounted upon the shaft 486 adjacent the inside of side wall 483 (Fig. 29). It is in continuous driving engagement with a freely rotating gear 488 (Fig. 34) upon a shaft 489, the gear 488 having an integral collar 490 that has an integral pair of diametrically spaced and axially extending clutch teeth 491 either of which may engage and drive a single axial tooth 492 upon a sleeve 493 journalled for rotating and sliding movement upon the shaft 489. Normally, the teeth 491 and 492 are disengaged by reason of a spring 494 (Fig. 34) surrounding the shaft 489 between the collar 490 and the sleeve 493, but when sleeve 493 is moved to the left by the depression of levers 452, 455 or 456 the clutch teeth 491 and 492 are engaged so that sleeve 493 will be rotated until the proper sum, five cents, ten cents or twenty cents is registered into the coin counter 458, whereupon the teeth 491 and 492 will disengage. Each of the levers 452, 455 and 456 has a protuberance 495, 496 or 497 (Fig. 31) on its end, which engages respectively a sleeve 498, 499 or 500 to move the sleeve 493 to the left (Fig. 34) to engage the clutch teeth 491 and 492 to drive the sleeve 493 until the proper sum has been added into the coin counter 458. The details of construction of the mechanism by which this is accomplished are well known as exemplified for example in Fig. 6 of the aforesaid Daugherty Patent 2,338,575 and for that reason the details need not be explained here, it being sufficient to explain coin is gaged and sorted its value is added to the total previously registered by the coin counter 458, just as in the aforesaid Patent 2,338,575.

It should be apparent that the complete depression of the selected lever 451-456 by the cam 269 and the lever 442 (Fig. 22a) occurs approximately during the first 180 degree rotation of the driven shaft 224. As the shaft 224 continues the remainder of its 360 degree rotation to return the cam 269 to the position shown in Fig. 22a, the cam 269 moves the lever 444 counter-clockwise to the limit of its movement and then releases it to snap back to its initial position under the influence of spring 446. This happens irrespective of the height of the lever 444 at the time, as determined by the diameter of the coin or token that has just been gaged, sorted and registered.

As shown in Fig. 14 there are four nested bells or gongs identified by the reference numbers 503, 504, 505 and 506, that are sounded respectively by the clappers 507, 508, 509 and 510. These clappers are attached to similar legs of bell cranks 513, 514, 515 and 516 (Fig. 19) that are connected by pins to the lower ends of vertical pull rods 517-520 (Fig. 19) secured at their upper ends to bell cranks 523-526 moving in vertical planes about a common horizontal pivot shaft 534 (Fig. 19).

As shown in Figs. 19 and 19a there are seven bell cranks 527-533 pivoted about a vertical shaft 535. As viewed in Fig. 19 the left legs of the bell cranks are all of the same length, and in the path of movement of a projecting lip 536 (Fig. 22a) on the leg 444 of the vertical shiftable bell crank on shaft 445. Depending upon the vertical position of the bell crank leg 444 resulting from coin gaging, the projecting lip 536 move one or more of the bell cranks 527-533 counter-clockwise and then release it, causing selected clappers 507-510 to strike the bells 503-506 under the influence of springs 537, one for each clapper. It is the function of the bells 503 to 506 to indicate by their sound, either singly or in combination, as when two or more are simultaneously struck, the value of a coin or token that has just been gaged, sorted and registered. As will be best apparent from Fig. 19a movement of the bell crank 532 by the lip 536, and the subsequent release of the crank, will cause the simultaneous striking of all four bells, which will produce a particular tone denoting the gaging and sorting of a quarter, which is the largest diameter coin or token normally handled by the illustrated fare box. The lowermost and seventh bell crank 533 would only ring the large bell 503, but since the illustrated fare box handles only six different diameter coins, tokens or the like as determined by the six lands 378-383 in the cam plate 376, the aforesaid bell crank 533 is superfluous in the illustrated embodiment and will normally be used only when the fare box is enlarged to handle coins, tokens or the like of seven different diameters. Taking another example, if a penny is gaged and sorted, it being the third from the smallest coin or token handled, the bell crank element 444 will be depressed three steps so that it engages and releases the bell crank 529 (Figs. 19 and 19a) to simultaneously ring the two smaller bells 505 and 506. Thus, as will be apparent from the various lengths of the bell cranks 527-533 and 523-526 of Fig. 19a, the particular bell or combination of bells that is rung will depend upon the diameter of the coin or token that has been gaged and sorted.

From the foregoing description, it will be apparent to those skilled in the art that our gaging, registering and totalizing mechanism may be readily adapted for various other uses in gaging and sorting.

Locking arrangement

One of the features of the illustrated fare box is a key controlled arrangement by which the operator can turn a key to place the fare box in operating condition, to turn it off so that the motor will not operate, and to lock it so that neither the motor nor the change maker will operate, thereby locking the change maker so that no one can remove coins from it, as when the operator is absent from the vehicle. The lock is indicated in Fig. 1 at 540, with a key 541. In the illustrated position the lock is "on" so that the motor and change maker will operate normally.

A cam plate 542 is mounted on the lock inside the casing, and rotates with the key 541 from the normal position shown at 542 (Fig. 1) to a second position 543 and to a third position. In the "on" position at 542 the cam plate raises the lever 545 (Fig. 15) of the switch arm of a main switch 546 to close the switch and condition the fare box for motor operation upon actuation of the plunger 103. By rotating the key 541 (and thus the cam plate 542) counter-clockwise the switch 546 is opened, thus preventing energization of the fare box operating motor 218. During its counter-clockwise rotation through 180 degrees the cam plate 542 will pass through the "off" position at 543 and finally to the "lock" position at 544. During the last 90 degrees portion of this movement it will depress a platform 547 (Fig. 15) that is integral with an upwardly extending member 548 (Fig. 35) and a downwardly extending element 549 that has a camming connection with a longitudinally movable locking plate 552 having vertical projections 553 that when pulled to the left as in Fig. 35 will positively secure or lock the keys 554 against depression, so that they cannot be operated to remove coins from the coin barrels. Thus the main motor switch 546 is open, and the change maker is locked when the key 541 is turned to make the cam 542 occupy the position shown at 544 in Fig. 1. When the key is turned to rotate the cam plate back to the initial position at 542 the locking plate 552 may be returned to the right (Fig. 35) to its unlocked position by manually pushing on a knob 555 that is secured to said plate. For a description of the locking of the change maker by the locking plate 552 reference may be had to the Daughterty patent 2,338,576. The member 548 extending upwardly from the platform 547 has a pin 556 that passes between a pair of toggle levers mounted upon pins 560 and 561 (Fig. 15) that have legs 562 and 563, which when the platform 547 is depressed as in Fig. 15, underlie the levers 145 and 146 and prevent their depression to actuate the counter assemblies 143 and 144 (Fig. 1). Raising of the platform and of the pin 556 rotates the toggle levers so that their legs 562 and 563 clear the levers 145 and 146.

In the appended claims the term "fare" is used to define coins, tokens or the like used in the payment of fares, and other objects which it may be desired to register or count and sort with our improved mechanism.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a mechanism of the class described a coin receiving hopper, a fare handling device; means forming a fare passage between said hopper and said handling device; rotary electric motor means operable to drive said handling device; and electric circuit for energizing said motor including a first switch; means for closing said switch; a second switch in said circuit operable to be closed by a fare in said passage including a movable contact mounted for reciprocating movement between a first position where it blocks said passage and engages a fare in the chute to close the circuit, and a second position removed from said passageway; a third switch in said circuit; means driven by said motor means to keep said third switch closed until a predetermined number of handling cycles have been completed following the closing of either said first or second switches; and means driven by said motor during each handling cycle for reciprocating the movable contact of said second switch between its first and second positions.

2. In a fare box, a hopper; a fare singling and gaging device; means forming a fare passage between said hopper and said device; a motor drive for said fare singling and gaging device; rejecting means preventing the passage of mutilated fares and objects larger than fares through said fare passage; a connection between said motor drive and said rejecting means to operate said rejecting means from said motor drive; and overload clutch between said motor drive and said coin singling and gaging device, operable to permit operation of said motor drive in the event of stoppage of the singling and gaging device.

3. In a fare box, a fare receiving hopper; a coin singling and gaging mechanism including a reciprocable ram; a passageway between said hopper and singling and gaging mechanism terminating at a point in the path of the working face of the ram; a rotating motor; a connection between the motor and ram including a crank pin and connecting rod for converting rotary motion of the motor to reciprocating motion of the ram; an electric circuit including a motor starting switch and a holding switch in parallel, operative to energize the motor through at least one cycle of operation of the ram; clutch means in said connection between the motor and ram; a fixed stop operative to disengage said clutch at the end of one full revolution of said crank pin; and means effective in response to movement of said motor to engage said clutch means.

4. In a fare box, a fare singling and gaging mechanism including a reciprocable ram; a rotating motor; a connection between the motor and ram operative to convert rotary motion to reciprocating motion; and electric circuit including a motor starting switch and a holding switch in parallel, operative to energize said motor through at least one cycle of operation of the ram; clutch means in said connection between the motor and ram; means operative to disengage said clutch at the end of one full revolution of said crank pin; and spring pressed detent means effective to hold the ram at the beginning of a working stroke upon disengagement of said clutch.

5. In a fare sorting and registering mechanism; a gaging element, a fare sorting device operable to direct fares along different paths according to their diameters; a gear driven in one direction by said gaging element; a rack driven by said gear; a cam on said rack connected to control said sorting device; a plurality of registers for totaling coins of different diameters; a second cam on said rack for selecting a register according to coin diameter; and means cooperating with said second cam to actuate the selected register.

6. In a fare box, coin and token singling and gaging means; a sorter mechanism responsive to said gaging means and operable to receive coins and tokens; a hopper for receiving coins and tokens having a passage therefor leading to said singling means; a change maker positioned to receive coins from said sorter mechanism; an electric motor connected to drive said singling and gaging means; an electric circuit for energizing said motor and including a first switch for initially closing said circuit; a second switch in parallel with said first switch and driven by said motor to hold said circuit closed for a predetermined number of operations of said singling means; a third switch in parallel in said circuit and responsive to engagement by a coin or token in said passage to close said circuit; a fourth switch in series with said circuit; and means for opening said fourth switch.

7. In a fare box, a fare singling mechanism; a hopper opening into said singling mechanism; a rotating motor; a drive connection between the motor and singling mechanism; an electric circuit including a motor starting switch and a holding switch in parallel, operative to energize the motor through a predetermined number of cycles of operation of the singling mechanism; clutch means in said connection between the motor and singling mechanism; a fixed stop operative to periodically disengage said electric motor from said singling mechanism and means responsive to movement of said motor to engage said clutch means to produce a periodic and momentary interruption in the drive to said singling mechanism.

8. In a fare box; a fare singling mechanism; a rotating motor; a connection between the motor and singling mechanism operative to drive said singling mechanism; an electric circuit including a motor starting switch and holding switch in parallel, operative to energize said motor through a predetermined number of cycles of operation of said singling mechanism; clutch means in said connection between the motor and singling mechanism; means operative to disengage said clutch at the end of one cycle of operation of said singling mechanism; and spring pressed detent means effective to hold the singling mechanism at the beginning of a cycle upon disengagement of said clutch.

9. In a fare box, a fare singling and gauging device; a hopper opening into said singling and gauging device; a motor drive for said fare singling and gauging device; rejecting means preventing the passage of multilated fares to said gauging device; an overload clutch between said motor drive and said coin singling device, operable to permit operation of said motor drive in the event of stoppage of the singling and gauging device.

References Cited in the file of this patent

UNITED STATES PATENTS

| Number | Name | Date |
| --- | --- | --- |
| 719,459 | Goetz | Feb. 3, 1903 |
| 914,821 | Gierding | Mar. 9, 1909 |
| 1,306,195 | Siqueira | June 10, 1919 |
| 1,344,841 | Woodward | June 29, 1920 |
| 1,344,898 | Johnson | June 29, 1920 |
| 1,356,947 | Vogelsong | Oct. 26, 1920 |
| 1,372,857 | Woodward | Mar. 29, 1921 |
| 1,738,997 | Hedley et al. | Dec. 10, 1929 |
| 2,338,575 | Daugherty | Jan. 4, 1944 |
| 2,338,576 | Daugherty | Jan. 4, 1944 |
| 2,474,843 | Helsing | July 5, 1949 |